United States Patent
Chendamarai Kannan et al.

(10) Patent No.: US 11,595,823 B2
(45) Date of Patent: Feb. 28, 2023

(54) MEDIUM RESERVATION USING ENERGY DETECTION AND RECEIVER ASSISTED CLEAR CHANNEL ASSESSMENT

(71) Applicant: QUALCOMM Incorporated, San Diego, CA (US)

(72) Inventors: Arumugam Chendamarai Kannan, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 16/519,989

(22) Filed: Jul. 23, 2019

(65) Prior Publication Data
US 2020/0037168 A1    Jan. 30, 2020

Related U.S. Application Data

(60) Provisional application No. 62/703,202, filed on Jul. 25, 2018.

(51) Int. Cl.
*H04W 16/14* (2009.01)
*H04W 72/04* (2009.01)
(Continued)

(52) U.S. Cl.
CPC .......... *H04W 16/14* (2013.01); *H04W 28/26* (2013.01); *H04W 72/0453* (2013.01); *H04W 74/0808* (2013.01)

(58) Field of Classification Search
CPC . H04W 16/14; H04W 28/26; H04W 72/0453; H04W 74/0808; H04W 74/0816; H04W 74/00–0891
See application file for complete search history.

(56) References Cited

U.S. PATENT DOCUMENTS 7,864,796 B1 *  1/2011  Benveniste ........... H04W 28/26
                                              370/462
2004/0228311 A1 * 11/2004 Sugaya ............. H04W 74/0816
                                              370/338
(Continued)

OTHER PUBLICATIONS

Cho S., et al., (Chung-Ang Univ): "Contention-based Directional MAC Protocols: A Survey; 11-09-0796-00-00ad-contention-based-directional-mac-protocols-a-survey", IEEE Draft; 11-09-0796-00-00AD-CONTENTION-BASED-DIRECTIONAL-MAC-PROTOCOLS-A-SURVEY, IEEE-SA Mentor, Piscataway, NJ USA, vol. 802.11ad, Jul. 14, 2009, pp. 1-43, XP017678588, [retrieved on Jul. 14, 2009] p. 2.
(Continued)

*Primary Examiner* — Derrick V Rose
(74) *Attorney, Agent, or Firm* — Holland & Hart LLP

(57) ABSTRACT

Methods, systems, and devices for wireless communications are described. A user equipment (UE) may receive a trigger signal indicating that a base station has obtained access to a shared radio frequency spectrum band. The UE may transmit, in response to the trigger signal, a trigger response signal configured to reserve a channel of the shared radio frequency spectrum band for a downlink transmission by the base station, where the trigger response signal is transmitted for a time period extending to a scheduled beginning of the downlink transmission. The UE may receive the downlink transmission after an expiration of the time period and based at least in part on the trigger signal.

30 Claims, 19 Drawing Sheets

(51) Int. Cl.
  *H04W 28/26* (2009.01)
  *H04W 74/08* (2009.01)
  *H04W 72/0453* (2023.01)

(56) References Cited

U.S. PATENT DOCUMENTS

| | | | | |
|---|---|---|---|---|
| 2004/0229566 | A1* | 11/2004 | Wang | H04W 74/0816 455/63.1 |
| 2009/0156121 | A1* | 6/2009 | Stahl | H04W 74/08 455/41.2 |
| 2014/0378157 | A1* | 12/2014 | Wei | H04W 16/14 455/454 |
| 2015/0156722 | A1* | 6/2015 | Kim | H04W 74/08 370/311 |
| 2015/0215100 | A1* | 7/2015 | Jeon | H04L 5/0053 370/252 |
| 2016/0227578 | A1 | 8/2016 | Lee et al. | |
| 2017/0048879 | A1* | 2/2017 | Zhang | H04W 72/1226 |
| 2017/0208627 | A1* | 7/2017 | You | H04L 5/001 |
| 2019/0230706 | A1* | 7/2019 | Li | H04W 72/0453 |
| 2020/0314906 | A1* | 10/2020 | Goyal | H04B 7/0695 |

OTHER PUBLICATIONS

IEEE: "IEEE P802.11ax™/D3.0", Draft Standard for Information technology—Telecommunications and information exchange between systems Local and metropolitan area networks—Specific requirements, published Jun. 1, 2018, URL: http://www.ieee802.org/11/private/Draft_Standards/11ax/Draft%20P802.11ax_D3.0.pdf XP055586579, section 9.3.1.23; p. 95-p. 97, Text and Figures on "User Info Field"; p. 100, line 56-p. 102, section 9.3.1.23.4; p. 106 section 27.2.5; p. 257-p. 260; figures 27-1, 27-2, 27-3 section 27.5.3.5; p. 292-p. 293.
International Search Report and Written Opinion—PCT/US2019/043480—ISA/EPO—dated Oct. 21, 2019 (183460WO).
Mediatek Inc: "Channel Access to NR-based Unlicensed Spectrum," 3GPP Draft; R1-1806797_NR-U_CHANNEL_ACCESS_FINAL, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018, May 20, 2018, XP051441999, 5 pages, Retrieved from the Internet: URL: http://www.3gpp.org/ftp/Meetings%5F3GPP%5FSYNC/RAN1/Docs/ [retrieved on May 20, 2018] section 3; figure 1 section 4; figure 2.

* cited by examiner

MEDIUM RESERVATION USING ENERGY DETECTION AND RECEIVER ASSISTED CLEAR CHANNEL ASSESSMENT

CROSS REFERENCE

The present application for patent claims the benefit of U.S. Provisional Patent Application No. 62/703,202 by Chendamarai Kannan et al., entitled "MEDIUM RESERVATION USING ENERGY DETECTION AND RECEIVER ASSISTED CLEAR CHANNEL ASSESSMENT," filed Jul. 25, 2018, assigned to the assignee hereof, and expressly incorporated herein.

BACKGROUND

The following relates generally to wireless communications, and more specifically to medium reservation using energy detection and receiver assisted clear channel assessment.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges (e.g., 28 GHz, 40 GHz, 60 GHz, etc.). Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

Certain wireless communication systems may operate in a shared or unlicensed radio frequency spectrum band. For example, a base station and/or UE may perform a listen-before-talk (LBT) procedure, a clear channel assessment (CCA) procedure, and the like, on channel(s) in order to capture the medium for a transmission. When the LBT procedure is unsuccessful, (e.g., the channel(s) is/are busy), energy is detected on the channel, and the like, the base station and/or UE may perform a backoff procedure where the device waits before attempting to capture the medium again to perform the transmission. Conventional medium capture techniques, however, are inefficient, ineffective, and generally do not provide a mechanism where the channel can be captured and/or reserved for a suitable time period to perform communications. For example, conventional techniques typically require both devices to perform an LBT procedure before transmitting on the medium, which can be inefficient when the devices are performing ongoing wireless communications between themselves (e.g., uplink and downlink communications, or vice versa). Conventional medium capture/reservation techniques are further complicated when the devices are operating in a mmW network, such as where omni-directional or directional LBT procedures can be performed.

SUMMARY

The described techniques relate to improved methods, systems, devices, and apparatuses that support medium reservation using energy detection and receiver assisted clear channel assessment. Generally, the described techniques provide for a user equipment (UE) to transmit a signal until the beginning of a downlink transmission in order to reserve the channel for a base station performing the downlink transmission. For example, the base station may perform a clear channel assessment (CCA) procedure on a channel of a shared or unlicensed radio frequency spectrum band to obtain access to the channel for the downlink transmission to the UE. Based on the results of the CCA procedure (e.g., when the CCA procedure is successful), the base station may transmit a trigger signal to the UE that carries or otherwise provides the indication that the base station has secured the channel for the downlink transmission. In response, the UE may transmit a trigger response signal that is configured to reserve the channel of the shared radio frequency spectrum band for the downlink transmission. In some aspects, the trigger response signal is transmitted for a time period that extends to the beginning of the downlink transmission. In some aspects, the trigger signal and the trigger response signal may be configured such that the UE and the base station know the intended recipient of the respective signal (e.g., may use a waveform configured based on the identity of the corresponding device). In some cases, the UE may perform a channel sensing operation (e.g., a CCA procedure) before sending the trigger response signal. The base station may perform the downlink transmission after the expiration of the time period (e.g., at the scheduled beginning of the downlink transmission). Accordingly, the UE may assist the base station in reserving the channel for the downlink transmission.

A method of wireless communication at a UE is described. The method may include receiving a trigger signal indicating that a base station has obtained access to a shared radio frequency spectrum band, transmitting, in response to the trigger signal, a trigger response signal configured to reserve a channel of the shared radio frequency spectrum band for a downlink transmission by the base station, where the trigger response signal is transmitted for a time period extending to a scheduled beginning of the downlink transmission, and receiving the downlink transmission after an expiration of the time period and based on the trigger signal.

An apparatus for wireless communication at a UE is described. The apparatus may include a processor, memory in electronic communication with the processor, and instructions stored in the memory. The instructions may be executable by the processor to cause the apparatus to receive a trigger signal indicating that a base station has obtained access to a shared radio frequency spectrum band, transmit, in response to the trigger signal, a trigger response signal configured to reserve a channel of the shared radio frequency spectrum band for a downlink transmission by the base station, where the trigger response signal is transmitted for a time period extending to a scheduled beginning of the downlink transmission, and receive the downlink transmission after an expiration of the time period and based on the trigger signal.

Another apparatus for wireless communication at a UE is described. The apparatus may include means for receiving a trigger signal indicating that a base station has obtained access to a shared radio frequency spectrum band, transmitting, in response to the trigger signal, a trigger response signal configured to reserve a channel of the shared radio frequency spectrum band for a downlink transmission by the base station, where the trigger response signal is transmitted for a time period extending to a scheduled beginning of the downlink transmission, and receiving the downlink transmission after an expiration of the time period and based on the trigger signal.

A non-transitory computer-readable medium storing code for wireless communication at a UE is described. The code may include instructions executable by a processor to receive a trigger signal indicating that a base station has obtained access to a shared radio frequency spectrum band, transmit, in response to the trigger signal, a trigger response signal configured to reserve a channel of the shared radio frequency spectrum band for a downlink transmission by the base station, where the trigger response signal is transmitted for a time period extending to a scheduled beginning of the downlink transmission, and receive the downlink transmission after an expiration of the time period and based on the trigger signal.

Some examples of the method, apparatuses, and non-transitory computer-readable medium described herein may further include operations, features, means, or instructions for selecting a waveform for transmitting the trigger response signal based on an identifier associated with the UE.

Some examples of the method, apparatuses, and non-transitory computer-readable medium described herein may further include operations, features, means, or instructions for performing a CCA procedure before transmitting the trigger response signal, wherein the CCA procedure comprises an omni-directional CCA procedure or a directional CCA procedure.

Some examples of the method, apparatuses, and non-transitory computer-readable medium described herein may further include operations, features, means, or instructions for identifying a delay period between receiving the trigger signal and the scheduled beginning of the downlink transmission, where the time period may be based on the delay period.

Some examples of the method, apparatuses, and non-transitory computer-readable medium described herein may further include operations, features, means, or instructions for receiving, prior to sending the trigger response signal, a configuration signal indicating the delay period.

In some examples of the method, apparatuses, and non-transitory computer-readable medium described herein, the configuration signal is received prior to the trigger signal.

Some examples of the method, apparatuses, and non-transitory computer-readable medium described herein may further include operations, features, means, or instructions for receiving, prior to receiving the trigger signal, a configuration signal indicating the delay period.

Some examples of the method, apparatuses, and non-transitory computer-readable medium described herein may further include operations, features, means, or instructions for transmitting, during a scheduled period of the downlink transmission, one or more instances of a repeat trigger response signal over the channel of the shared radio frequency spectrum band.

In some examples of the method, apparatuses, and non-transitory computer-readable medium described herein, the trigger response signal may include operations, features, means, or instructions for setting a network allocation vector (NAV) of the reservation response signal (RRS) based on the time period.

A method of wireless communication at a base station is described. The method may include transmitting a trigger signal to a UE indicating that the base station has obtained access to a shared radio frequency spectrum band for a downlink transmission to the UE, receiving, based on the trigger signal, a trigger response signal configured to reserve the channel of the shared radio frequency spectrum band for the downlink transmission, where the trigger response signal is received for a time period extending to a scheduled beginning of the downlink transmission, and transmitting the downlink transmission after an expiration of the time period and based on the trigger signal.

An apparatus for wireless communication at a base station is described. The apparatus may include a processor, memory in electronic communication with the processor, and instructions stored in the memory. The instructions may be executable by the processor to cause the apparatus to transmit a trigger signal to a UE indicating that the base station has obtained access to a shared radio frequency spectrum band for a downlink transmission to the UE, receive, based on the trigger signal, a trigger response signal configured to reserve the channel of the shared radio frequency spectrum band for the downlink transmission, where the trigger response signal is received for a time period extending to a scheduled beginning of the downlink transmission, and transmit the downlink transmission after an expiration of the time period and based on the trigger signal.

Another apparatus for wireless communication at a base station is described. The apparatus may include means for transmitting a trigger signal to a UE indicating that the base station has obtained access to a shared radio frequency spectrum band for a downlink transmission to the UE, receiving, based on the trigger signal, a trigger response signal configured to reserve the channel of the shared radio frequency spectrum band for the downlink transmission, where the trigger response signal is received for a time period extending to a scheduled beginning of the downlink transmission, and transmitting the downlink transmission after an expiration of the time period and based on the trigger signal.

A non-transitory computer-readable medium storing code for wireless communication at a base station is described. The code may include instructions executable by a processor to transmit a trigger signal to a UE indicating that the base station has obtained access to a shared radio frequency spectrum band for a downlink transmission to the UE, receive, based on the trigger signal, a trigger response signal configured to reserve the channel of the shared radio frequency spectrum band for the downlink transmission, where the trigger response signal is received for a time period extending to a scheduled beginning of the downlink transmission, and transmit the downlink transmission after an expiration of the time period and based on the trigger signal.

Some examples of the method, apparatuses, and non-transitory computer-readable medium described herein may further include operations, features, means, or instructions for performing a CCA procedure to obtain the access to the shared radio frequency spectrum band to obtain, where the CCA procedure includes an omni-directional CCA procedure or a directional CCA procedure.

Some examples of the method, apparatuses, and non-transitory computer-readable medium described herein may further include operations, features, means, or instructions for determining, based on a waveform used for the trigger response signal, an identifier associated with the UE.

Some examples of the method, apparatuses, and non-transitory computer-readable medium described herein may further include operations, features, means, or instructions for transmitting, prior to transmitting the trigger signal, a configuration signal identifying a delay period between transmitting the trigger signal and the scheduled beginning of the downlink transmission.

Some examples of the method, apparatuses, and non-transitory computer-readable medium described herein may further include operations, features, means, or instructions for receiving, during the downlink transmission, one or more instances of a repeat trigger response signal over the channel of the shared radio frequency spectrum band.

Some examples of the method, apparatuses, and non-transitory computer-readable medium described herein may further include operations, features, means, or instructions for configuring the trigger signal to indicate that the base station may have obtained access to the shared radio frequency spectrum band for downlink transmissions to a set of UEs.

Some examples of the method, apparatuses, and non-transitory computer-readable medium described herein may further include operations, features, means, or instructions for receiving trigger response signals from a subset of the set of UEs and selecting one or more UEs of the subset of UEs to perform the downlink transmissions to.

In some examples of the method, apparatuses, and non-transitory computer-readable medium described herein, the trigger response signal may include operations, features, means, or instructions for decoding the RRS to identify a NAV.

DETAILED DESCRIPTION

Figure 1:
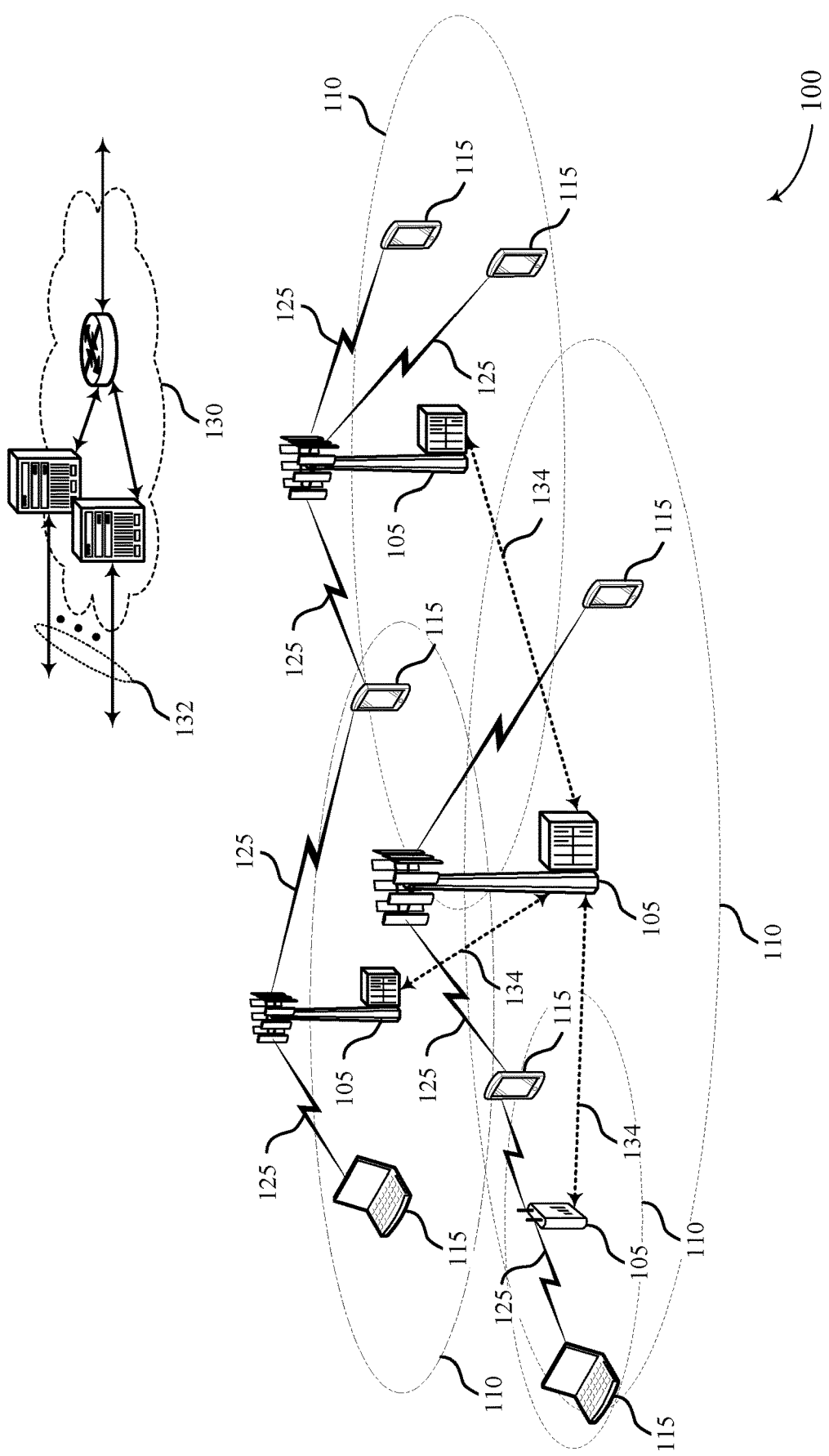
FIG. 1 illustrates an example of a system for wireless communications that supports medium reservation using energy detection and receiver assisted clear channel assessment in accordance with aspects of the present disclosure.

Some wireless communication systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (e.g., directional transmission) may be used to coherently combine signal energy and overcome the path loss in specific beam directions. In some cases, a device may select an active beam for communicating with a network by selecting the strongest beam from among a number of candidate beams.

In some aspects, wireless communication systems may operate in a shared or unlicensed radio frequency spectrum band where the devices must perform a listen-before-talk (LBT) procedure, such as a clear channel assessment (CCA) procedure, to capture the medium or channel before performing a wireless transmission. Conventional LBT procedures, however, are inefficient and may not provide suitable flexibility to the devices for capturing and reserving the medium to perform communications (e.g., uplink and downlink communications) without requiring each device to perform a lengthy or inappropriate LBT procedure before transmitting on the channel.

Aspects of the disclosure are initially described in the context of a wireless communications system. Generally, aspects of the described techniques provide a mechanism where a UE assists a base station in reserving a channel for a downlink transmission. For example, the UE and base station may be operating in a shared or unlicensed radio frequency spectrum band where the channel must be contended for prior to a transmission. The base station may secure the channel (e.g., based on a successful CCA procedure), and may transmit a trigger signal to the UE that carries or otherwise conveys an indication that the base station has obtained the channel for the downlink transmission. In response, the UE may transmit a trigger response signal that is configured to reserve the channel of the shared radio frequency spectrum band for the downlink transmission. In some aspects, the trigger response signal may be transmitted for a time period that extends until a beginning of the downlink transmission (e.g., the trigger response signal may occupy the channel until the downlink transmission begins). In some cases, the UE may perform a channel sensing operation (e.g., a CCA procedure) before sending the trigger response signal. The base station may perform the downlink transmission to the UE at the scheduled beginning of the downlink transmission, (e.g., when the trigger response signal ends).

Aspects of the disclosure are further illustrated by and described with reference to apparatus diagrams, system diagrams, and flowcharts that relate to medium reservation using energy detection and receiver assisted clear channel assessment.

FIG. 1 illustrates an example of a wireless communications system 100 that supports medium reservation using energy detection and receiver assisted clear channel assessment in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may receive a trigger signal indicating that a base station 105 has obtained access to a shared radio frequency spectrum band. The UE 115 may transmit, in response to the trigger signal, a trigger response signal configured to reserve a channel of the shared radio frequency spectrum band for a downlink transmission by the base station 105, where the trigger response signal is transmitted for a time period extending to a scheduled beginning of the downlink transmission. In some cases, the UE may perform a channel sensing operation (e.g., a CCA procedure) before sending the trigger response signal. The UE 115 may receive the downlink transmission after an expiration of the time period and based at least in part on the trigger signal.

A base station 105 may transmit a trigger signal to a UE 115 indicating that the base station has obtained access to a shared radio frequency spectrum band for a downlink transmission to the UE. The base station 105 may receive, based at least in part on the trigger signal, a trigger response signal configured to reserve the channel of the shared radio frequency spectrum band for the downlink transmission, where the trigger response signal is received for a time period extending to a scheduled beginning of the downlink transmission. The base station 105 may transmit the downlink transmission after an expiration of the time period and based at least in part on the trigger signal.

Figure 2:
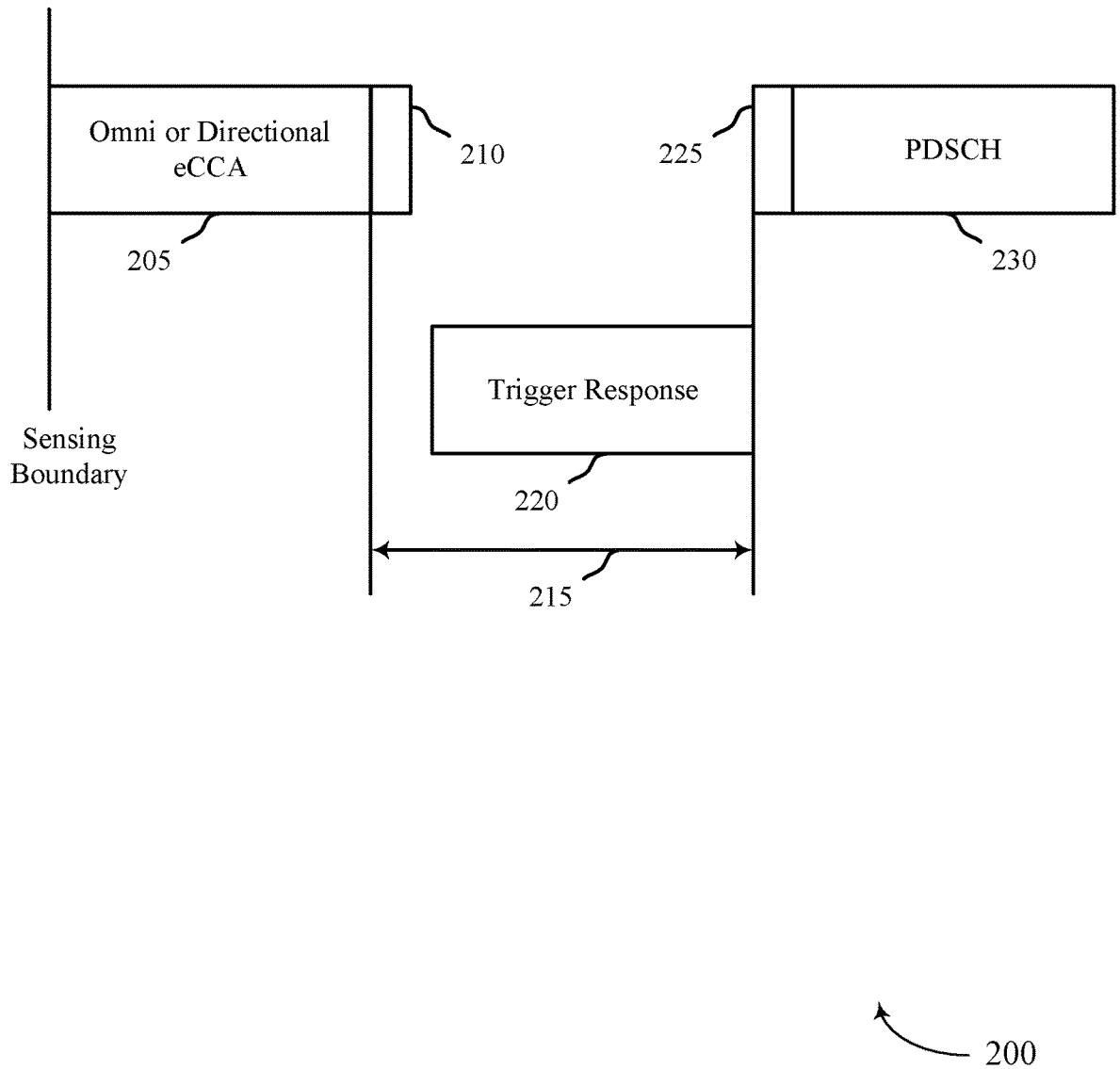
FIG. 2 illustrates an example of a medium reservation scheme that supports medium reservation using energy detection and receiver assisted clear channel assessment in accordance with aspects of the present disclosure.

FIG. 2 illustrates an example of a medium reservation scheme 200 that supports medium reservation using energy detection and receiver assisted clear channel assessment in accordance with aspects of the present disclosure. In some examples, medium reservation scheme 200 may implement aspects of wireless communication system 100. Aspects of medium reservation scheme 200 may be implemented by a base station and/or a UE, which may be examples of the corresponding devices described herein. In some aspects, medium reservation scheme 200 may be implemented in a wireless communication system, such as a mmW wireless network or other wireless networks. In some aspects, medium reservation scheme 200 illustrates a receiver energy detection based scheme over a single link where the wireless communication network is synchronized, at least to some degree, such as to a sensing boundary.

Generally, a base station and UE may be operating in a shared or unlicensed radio frequency spectrum band. In some aspects, the base station and UE may be operating in a mmW network or other network. The base station may determine that it has a downlink transmission designated for the UE. In some aspects, the base station may be at least partially synchronized, and may therefore begin performing a CCA procedure 205 on a channel of the shared radio frequency spectrum band. In some aspects, the CCA procedure 205 may be an LBT procedure, such as an extended CCA procedure or a short CCA procedure. In some aspects, the CCA procedure 205 may be an omni-directional CCA procedure or a directional CCA procedure. For example, in some aspects an omni-directional CCA procedure may be used when the base station has downlink transmissions to perform to multiple UEs. In some aspects, a directional CCA procedure may improve the chances of success of the CCA procedure 205. In some aspects, other considerations may determine whether CCA procedure 205 is directional or omni-directional. In some aspects, the base station may start the CCA procedure 205 at the beginning of a sensing boundary (e.g., at the beginning of a mini-slot, a slot, a subframe, etc.) that is known based on the degree of synchronization in the wireless network. In some aspects, the synchronization may be between devices operating for a given provider, between providers, and the like.

Based on the results of the CCA procedure 205, (e.g., based on the CCA procedure 205 being successful), the base station may transmit a trigger signal 210, which may include or otherwise convey an indication that the base station has obtained access to the shared radio frequency spectrum band in order to perform the downlink transmission to the UE. In some aspects, the trigger signal 210 may carry or otherwise convey an indication of a time period 215 associated with the downlink transmission. For example, the trigger signal 210 may include or convey a KO value for the UE. In some aspects, the time period 215 may, for the UE, identify the time of a scheduled beginning of the downlink transmission for the UE.

In some aspects, the trigger signal 210 may be for the UE, (e.g., the trigger signal may be configured such that the intended UE for the downlink transmission can identify or otherwise determine that the trigger signal 210 is intended for it). For example, the trigger signal 210 may be transmitted using a waveform configuration that is associated with the UE, (e.g., based on the identifier of the UE), such that the UE can identify the waveform configuration and determine that the trigger signal 210 is for it. As another example, one or more bits, fields, and the like, of the trigger signal 210 may be scrambled using an identifier of the UE, such that the UE can descramble or otherwise decode the trigger signal 210 to determine that the trigger signal 210 is intended for it. In some aspects, the trigger signal 210 may be conveyed or otherwise indicated in a medium access control (MAC) control element (CE), a downlink control indicator (DCI), and the like.

In response to the trigger signal 210, the UE may transmit a trigger response signal 220 that is configured to reserve the channel of the shared radio frequency spectrum band for the downlink transmission. For example, the trigger response signal 220 may be transmitted for some or all of the time period 215. Transmitting the trigger response signal 220 for the remaining portion of the time period 215 may provide energy on the medium that can be detected by other nodes competing for the medium. For example, the UE may identify the beginning of the downlink transmission (e.g., based at least in part on the trigger signal 210), and transmit the trigger response signal 220 until the beginning of the scheduled downlink transmission. In some cases, the UE may perform a channel sensing operation before sending the trigger response signal. In some cases, the channel sensing operation may be a CCA procedure (e.g., an extended CCA, a short CCA, a directional or omnidirectional CCA, a one-shot CCA, etc.). In some aspects, this may include the UE identifying the delay between receiving the trigger signal 210 and the scheduled beginning of the downlink transmission, and deducting the delay period from the time period 215. In some aspects, the UE may be preconfigured with the time period 215 (e.g., during initial connection set up with the base station), or may receive an indication of the delay period 215 in the trigger signal 210. For example, when preconfigured with the time period 215, the UE may receive the indication of the time period 215 prior to receiving the trigger signal 210.

In some aspects, the trigger response signal 220 may reserve the channel until the beginning of the downlink transmission for the UE. For example, the trigger response signal 220 may provide a threshold amount of energy on the channel such that other devices performing the LBT or CCA procedures detect the trigger response signal 220 and determine that the channel is unavailable. Accordingly, the trigger response signal 220 transmitted by the UE may provide a UE-assisted mechanism where the channel may be reserved for the base station to perform a downlink transmission to the UE, where the base station may not perform a second CCA procedure on the channel. That is, the trigger response signal 220 may act at as a medium reservation signal to block other sensing nodes (e.g., potential other transmitting nodes) from capturing the channel and interrupting the downlink transmission from the base station to the UE.

In some aspects, the trigger response signal 220 may be configured in such a manner that the base station recognizes the trigger response signal 220 as coming from the UE (e.g., rather than from some other device transmitting on the channel). For example, the trigger response signal 220 may be transmitting using a waveform configuration that is associated with the UE (e.g., based on the identifier of the UE), and can therefore be recognized by the base station as coming from the UE. Thus, while the trigger response signal 220 may be recognizable between the UE and the base station, other devices attempting to operate on the channel of the shared radio frequency spectrum band may only detect energy on the channel and therefore determine that the channel is unavailable.

The base station may begin the downlink transmission to the UE by transmitting control information 225 (e.g., PDCCH), which carries or otherwise provides an indication of the grant of resources for the downlink transmission. The base station may continue the downlink transmission to the UE by transmitting data 230 (e.g., PDSCH), to the UE. Therefore, the base station may be able to transmit the control information 225 to the UE at the scheduled beginning of the downlink transmission and without having to perform a second CCA procedure before transmitting the control information 225.

Figure 3:
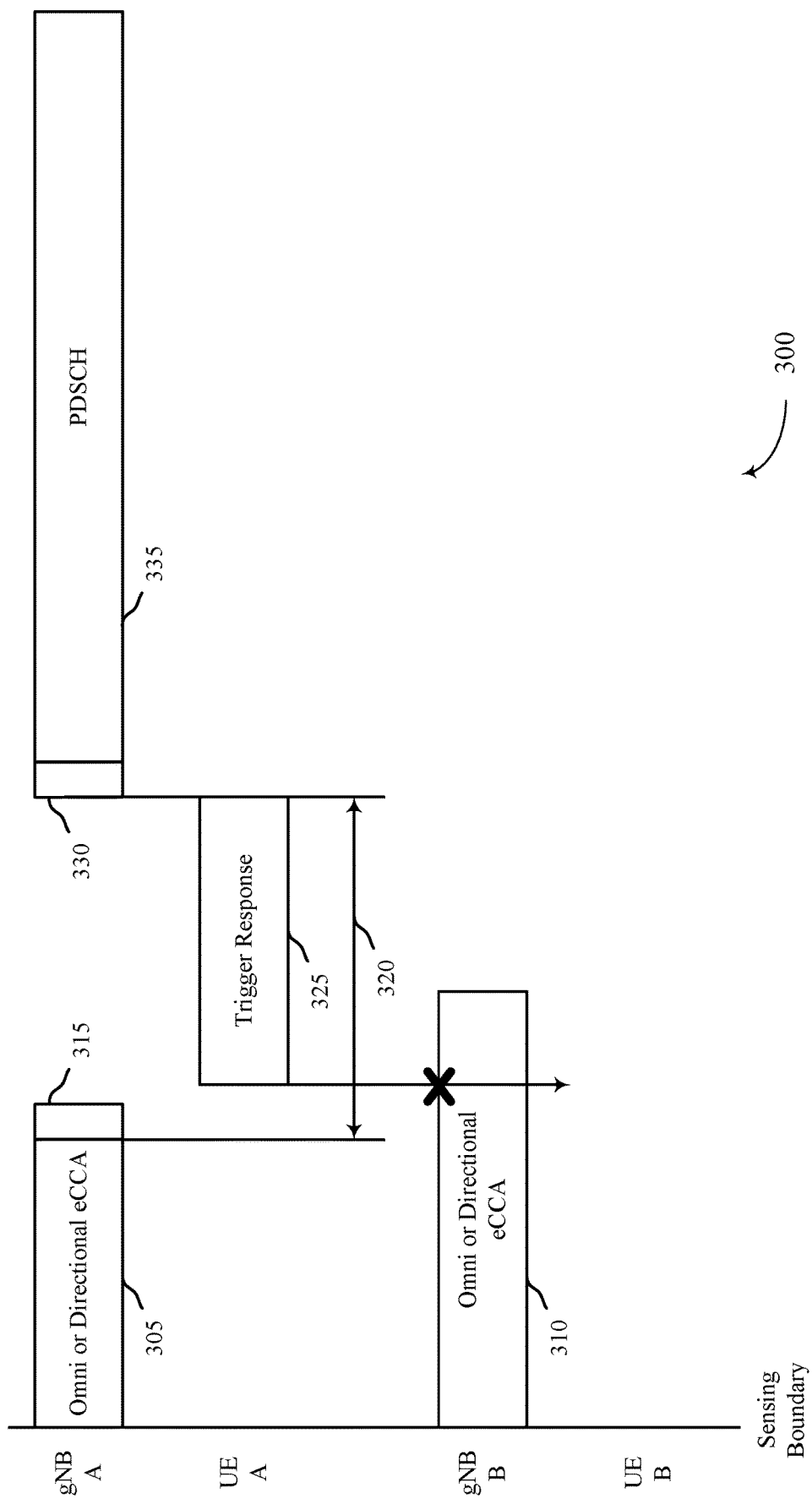
FIG. 3 illustrates an example of a medium reservation scheme that supports medium reservation using energy detection and receiver assisted clear channel assessment in accordance with aspects of the present disclosure.

FIG. 3 illustrates an example of a medium reservation scheme 300 that supports medium reservation using energy detection and receiver assisted clear channel assessment in accordance with aspects of the present disclosure. In some examples, medium reservation scheme 300 may implement aspects of wireless communication system 100 and/or medium reservation scheme 200. Aspects of medium reservation scheme 300 may be implemented by a base station and/or a UE, which may be examples of the corresponding devices described herein. In some aspects, medium reservation scheme 300 may be implemented in a wireless communication system, such as a mmW wireless network. In some aspects, medium reservation scheme 300 illustrates a receiver energy detection based scheme where the wireless communication network is synchronized, at least to some degree.

Generally, a base station (identified as gNB A) and UE (identified as UE A) may be operating in a shared or unlicensed radio frequency spectrum band. In some aspects, the base station and UE may be operating in a mmW network or other network. The base station may determine that it has a downlink transmission to perform to the UE. In some aspects, the base station may be at least partially synchronized, and may therefore begin performing a CCA procedure 305 on a channel of the shared radio frequency spectrum band. In some aspects, the CCA procedure 305 may be an LBT procedure, such as an extended CCA procedure or a short CCA procedure. In some aspects, the CCA procedure 305 may be an omni-directional CCA procedure or a directional CCA procedure. In some aspects, the base station may start the CCA procedure 305 at the beginning of a sensing boundary (e.g., at the beginning of a mini-slot, a slot, a subframe, etc.) that is known based at least in part on the degree of synchronization.

In some aspects, a second base station (identified as gNB B) may also have a downlink transmission to perform to a second UE (identified as UE B). Accordingly, the second base station may begin its own CCA procedure 310 at the beginning of the sensing boundary. That is, the base station (gNB A) and the second base station may be synchronized to a degree that allows them to start their respective CCA procedures at the sensing boundary. In some aspects, the duration of the CCA procedure (e.g., CCA procedure 305 and/or CCA procedure 310) may be based on a seed or other random number selected or otherwise identified by the corresponding base station. In the illustration of FIG. 3, the duration of the CCA procedure 310 is longer than the duration of the CCA procedure 305.

Based on the result of the CCA procedure 305 being successful, the base station may transmit a trigger signal 315, which includes or otherwise conveys an indication that the base station has obtained access to the shared radio frequency spectrum band in order to perform a downlink transmission to the UE. In some aspects, the trigger signal 315 may carry or otherwise convey an indication of a time period 320 associated with the downlink transmission (e.g., a K4 value for the UE). In some aspects, the time period 320 may, for the UE, identify the time of a scheduled beginning of the downlink transmission for the UE. In some aspects, the K4 value may be associated with the gap between the trigger signal 315 and the beginning of the downlink transmission (e.g., transmission of control information for the downlink transmission).

In some aspects, the trigger signal 315 may be for the UE, (e.g., may be configured such that the intended UE (e.g., UE A) for the downlink transmission can identify or otherwise determine that the trigger signal 315 is intended for it). For example, the trigger signal 315 may be transmitted using a waveform configuration that is associated with the UE (e.g., based on the UE identifier), such that the UE can identify the waveform configuration and determine that the trigger signal 315 is intended for it. As another example, one or more bits, fields, and the like, of the trigger signal 315 may be scrambled using an identifier of the UE, such that the UE can descramble or otherwise decode the trigger signal 315 to determine that the trigger signal 315 is intended for it. In some aspects, the trigger signal 315 may be conveyed or otherwise indicated in a MAC CE, a DCI, and the like.

In some aspects, the second base station (e.g., gNB B) may not be close enough to the base station (e.g., gNB A) to receive the trigger signal 315. Accordingly, the trigger signal 315 may not be detected during the CCA procedure 310 of the second base station.

In response to the trigger signal 315, the UE (e.g., UE A) may transmit a trigger response signal 325 that is configured to reserve the channel of the shared radio frequency spectrum band for the downlink transmission. For example, the trigger response signal 325 may be transmitted for some or all of the time period 320. For example, the UE may identify the beginning of the downlink transmission (e.g., based at least in part on the trigger signal 315), and transmit the trigger response signal 325 until the beginning of the scheduled downlink transmission. In some aspects, this may include the UE identifying the delay between receiving the trigger signal 315 and the scheduled beginning of the downlink transmission, and deducting the delay period from the time period 320. In some aspects, the UE may be preconfigured with the time period 320 (e.g., during initial connection set up with the base station), or may receive an indication of the delay period 320 in the trigger signal 315. For example, when preconfigured with the time period 320, the UE may receive the indication of the time period 320 prior to receiving the trigger signal 315.

In some aspects, the trigger response signal 325 may reserve the channel until the beginning of the downlink transmission for the UE. For example, the trigger response signal 325 may provide a threshold amount of energy on the channel such that other devices performing a CCA procedures detect the trigger response signal 325 and determine that the channel is unavailable. In some cases, the UE may perform a channel sensing operation before sending the trigger response signal. In some cases, the channel sensing operation may be a CCA procedure (e.g., an extended CCA, a short CCA, a directional or omnidirectional CCA, a one-shot CCA, etc.). As illustrated in FIG. 3, the trigger response signal 325 may be detected by the second base station during its CCA procedure 310, and therefore the second base station may determine that the result of its CCA procedure 310 is unsuccessful. Accordingly, the second base station may delay its downlink transmission to the second UE (e.g., UE B). Accordingly, the trigger response signal 325 transmitted by the UE may provide a UE-assisted mechanism where the channel can be reserved for the base station to perform a downlink transmission to the UE. That is, the trigger response signal 325 may act at as a medium reservation signal to block other sensing nodes (e.g., potential other transmitting nodes) from capturing the channel and interrupting the downlink transmission.

In some aspects, the trigger response signal 325 may be configured in such a manner that the base station recognizes the trigger response signal 325 as coming from the UE, (e.g., rather than from some other device transmitting on the channel). For example, the trigger response signal 325 may be transmitting using a waveform configuration that is associated with the UE (e.g., based on an identifier of the UE), and can therefore be recognized by the base station. Thus, while the trigger response signal 325 may be recognizable between the UE and the base station, other devices attempting to operate on the channel of the shared radio frequency spectrum band may only detect energy on the channel and therefore determine that the channel is unavailable.

The base station may begin the downlink transmission to the UE by transmitting control information 330, (e.g., PDCCH), which carries or otherwise provides an indication of the grant or resources for the downlink transmission. The base station may continue the downlink transmission to the UE by transmitting data 335, (e.g., PDSCH), to the UE. Therefore, the base station may be able to transmit the control information 330 to the UE at the scheduled beginning of the downlink transmission.

Thus, the sensing boundary may be aligned (e.g., between different operators), where the base station (e.g., gNB A) drew a smaller random number for its CCA procedure 305. The trigger response signal 325 transmitted by the UE (e.g., UE A) blocks the CCA procedure 310 of the second base station (e.g., gNB B). Based on the failed CCA procedure 310, the second base station may try again to perform its downlink transmission at the next sensing boundary.

Figure 4:
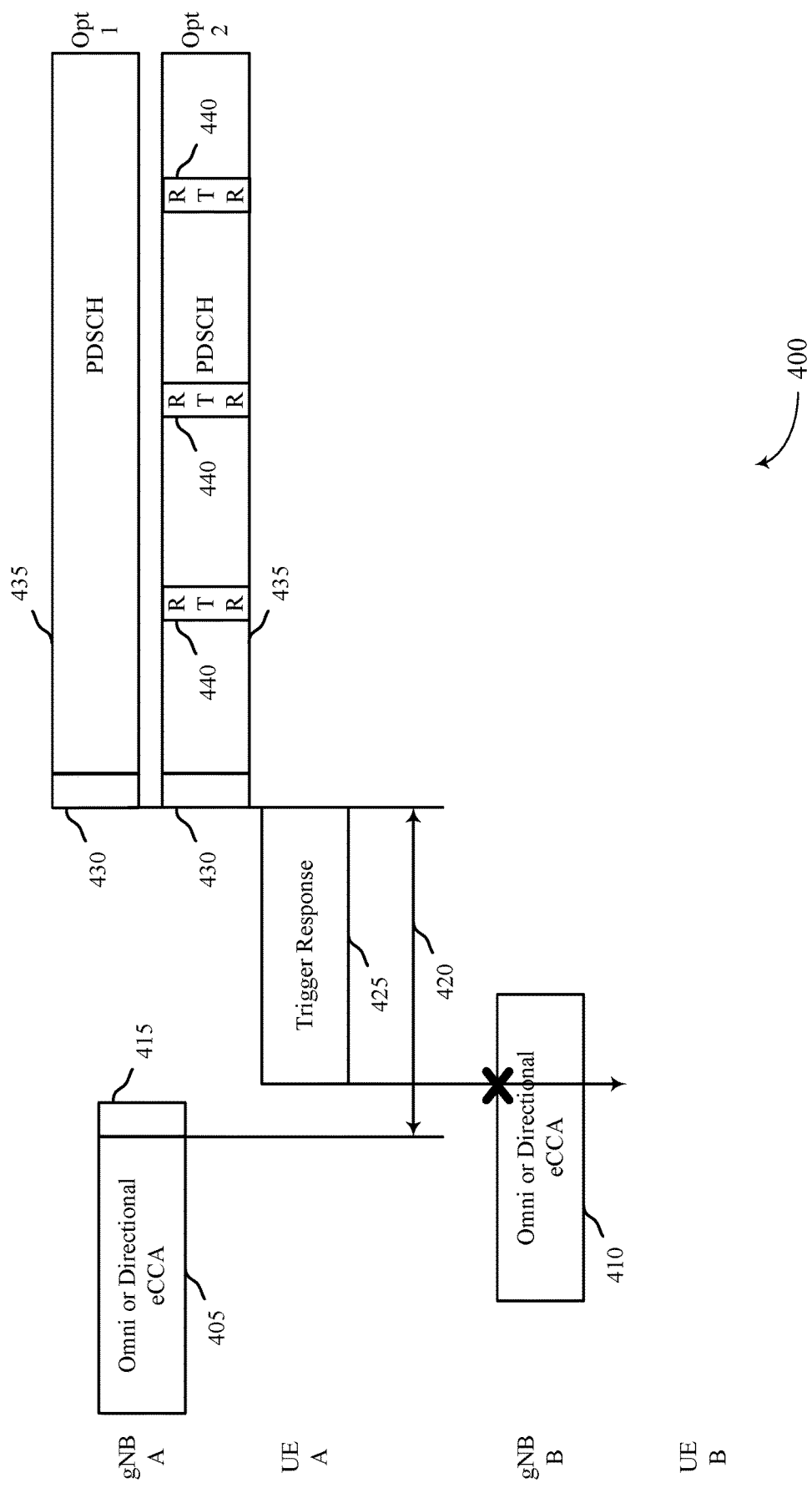
FIG. 4 illustrates an example of a medium reservation scheme that supports medium reservation using energy detection and receiver assisted clear channel assessment in accordance with aspects of the present disclosure.

FIG. 4 illustrates an example of a medium reservation scheme 400 that supports medium reservation using energy detection and receiver assisted clear channel assessment in accordance with aspects of the present disclosure. In some examples, medium reservation scheme 400 may implement aspects of wireless communication system 100 and/or medium reservation schemes 200/300. Aspects of medium reservation scheme 400 may be implemented by a base station and/or a UE, which may be examples of the corresponding devices described herein. In some aspects, medium reservation scheme 400 may be implemented in a wireless communication system, such as a mmW wireless network. In some aspects, medium reservation scheme 400 illustrates a receiver energy detection based scheme where the wireless communication network is not synchronized (e.g., asynchronous).

Generally, a base station (identified as gNB A) and UE (identified as UE A) may be operating in a shared or unlicensed radio frequency spectrum band. In some aspects, the base station and UE may be operating in a mmW network or other network. The base station may determine that it has a downlink transmission to perform to the UE. In some aspects, the base station may begin performing a CCA procedure 405 on a channel of the shared radio frequency spectrum band. As the wireless communication network is asynchronous, the base station may begin performing the CCA procedure 405 without regard to a sensing boundary (at least with respect to the second base station (identified as gNB B). In some aspects, the CCA procedure 405 may be an LBT procedure, such as an extended CCA procedure or a short CCA procedure. In some aspects, the CCA procedure 405 may be an omni-directional CCA procedure or a directional CCA procedure.

In some aspects, the second base station (e.g., gNB B) may also have a downlink transmission to perform to a second UE (identified as UE B). Accordingly, the second base station may begin its own CCA procedure 410. However, as the wireless communication network is asynchronous, the second base station may begin its CCA procedure 410 later in time than the CCA procedure 405.

Based on the result of the CCA procedure 405 being successful, the base station may transmit a trigger signal 415, which includes or otherwise conveys an indication that the base station has obtained access to the shared radio frequency spectrum band in order to perform a downlink transmission to the UE. In some aspects, the trigger signal 415 may carry or otherwise convey an indication of a time period 420 associated with the downlink transmission (e.g., a K4 value) for the UE. In some aspects, the time period 420 may, for the UE, identify the time of a scheduled beginning of the downlink transmission for the UE. In some aspects, the K4 value may be associated with the gap between the trigger signal 415 and the beginning of the downlink transmission (e.g., transmission of control information for the downlink transmission).

In some aspects, the trigger signal 415 may be for the UE (e.g., the trigger signal may be configured such that the intended UE (e.g., UE A) for the downlink transmission can identify or otherwise determine that the trigger signal 415 is intended for it). For example, the trigger signal 415 may be transmitted using a waveform configuration that is associated with the UE, such that the UE can identify the waveform configuration and determine that the trigger signal 415 is for it. For example, the waveform may be based on an identifier of the UE. As another example, one or more bits, fields, and the like, of the trigger signal 415 may be scrambled using an identifier of the UE, such that the UE can descramble or otherwise decode the trigger signal 415 to determine that the trigger signal 415 is intended for it. In some aspects, the trigger signal 415 may be conveyed or otherwise indicated in a MAC CE, a DCI, and the like.

In some aspects, the second base station (e.g., gNB B) may not be close enough to the other base station (e.g., gNB A) to receive the trigger signal 415. Accordingly, the trigger signal 415 may not be detected during the CCA procedure 410 of the second base station.

In response to the trigger signal 415, the UE may transmit a trigger response signal 425 that is configured to reserve the channel of the shared radio frequency spectrum band for the downlink transmission. For example, the trigger response signal 425 may be transmitted for some or all of the time period 420. For example, the UE may identify the beginning of the downlink transmission (e.g., based at least in part on the trigger signal 415), and may transmit the trigger response signal 425 until the beginning of the scheduled downlink transmission. In some aspects, this may include the UE identifying the delay between receiving the trigger signal 415 and the scheduled beginning of the downlink transmission, and deducting the delay period from the time period 420. In some aspects, the UE may be preconfigured with the time period 420 (e.g., during initial connection setup with the base station), or may receive an indication of the time period 420 in the trigger signal 415. For example, when preconfigured with the time period 420, the UE may receive the indication of the time period 420 prior to receiving the trigger signal 415.

In some aspects, the trigger response signal 425 may reserve the channel until the beginning of the downlink transmission for the UE. For example, the trigger response signal 425 may provide a threshold amount of energy on the channel such that other devices performing a CCA procedures detect the trigger response signal 425 and determine that the channel is unavailable. As illustrated in FIG. 4, the trigger response signal 425 may be detected by the second base station during its CCA procedure 410, and therefore the second base station may determine that the result of its CCA procedure 410 is unsuccessful. Accordingly, the second base station may delay its downlink transmission to the second UE, (e.g., UE B) Accordingly, the trigger response signal 425 transmitted by the UE may provide a UE-assisted mechanism where the channel can be reserved for the base station to perform a downlink transmission to the UE. That is, the trigger response signal 425 may act at as a medium reservation signal to block other sensing nodes (e.g., potential other transmitters) from capturing the channel and interrupting the downlink transmission.

In some aspects, the trigger response signal 425 may be configured in such a manner that the base station recognizes the trigger response signal 425 as coming from the UE, (e.g., rather than from some other device transmitting on the channel). For example, the trigger response signal 425 may be transmitted using a waveform configuration that is associated with the UE (e.g., based on an identifier of the UE), and can therefore be recognized by the base station as coming from the UE. Thus, while the trigger response signal 425 may be recognizable between the UE and the base station, other devices attempting to operate on the channel of the shared radio frequency spectrum band may only detect energy on the channel and therefore determine that the channel is unavailable.

The base station may begin the downlink transmission to the UE by transmitting control information 430 (e.g., PDCCH), which carries or otherwise provides an indication of the grant of resources for the downlink transmission. The base station may continue the downlink transmission to the UE by transmitting data 435 (e.g., PDSCH), to the UE. Therefore, the base station may be able to transmit the control information 430 to the UE at the scheduled beginning of the downlink transmission.

In some aspects, two options are illustrated with regard to protecting the downlink transmission to the UE in terms of medium reservation. In a first option (identified as Option 1), the base station may simply transmit the data 435 to the UE during the downlink transmission. In a second option (identified as Option 2), the UE may transmit one or more instances of a repeat trigger response (RTR) 440 during the downlink transmission. In some aspects, the RTR 440 may increase the chances of blocking the second base station (e.g., gNB B) from attempting to capture the channel during the downlink transmission. For example, as the second base station is within range of the UE (e.g., UE A), the one or more instances of the RTR 440 transmitted by the UE during the downlink transmission serves to reserve the channel and avoid interruption of the downlink transmission by the second base station (or other nodes within range of the UE). In some aspects, the one or more instances of the RTR 440 may be transmitted according to a configuration, periodicity, duty cycle, and the like, that is known by the base station and the UE. For example, the base station may know the information for the RTR 440 transmitted by the UE, and may therefore pause transmitting the data 435 to allow the UE to transmit the RTR 440.

Figure 5:
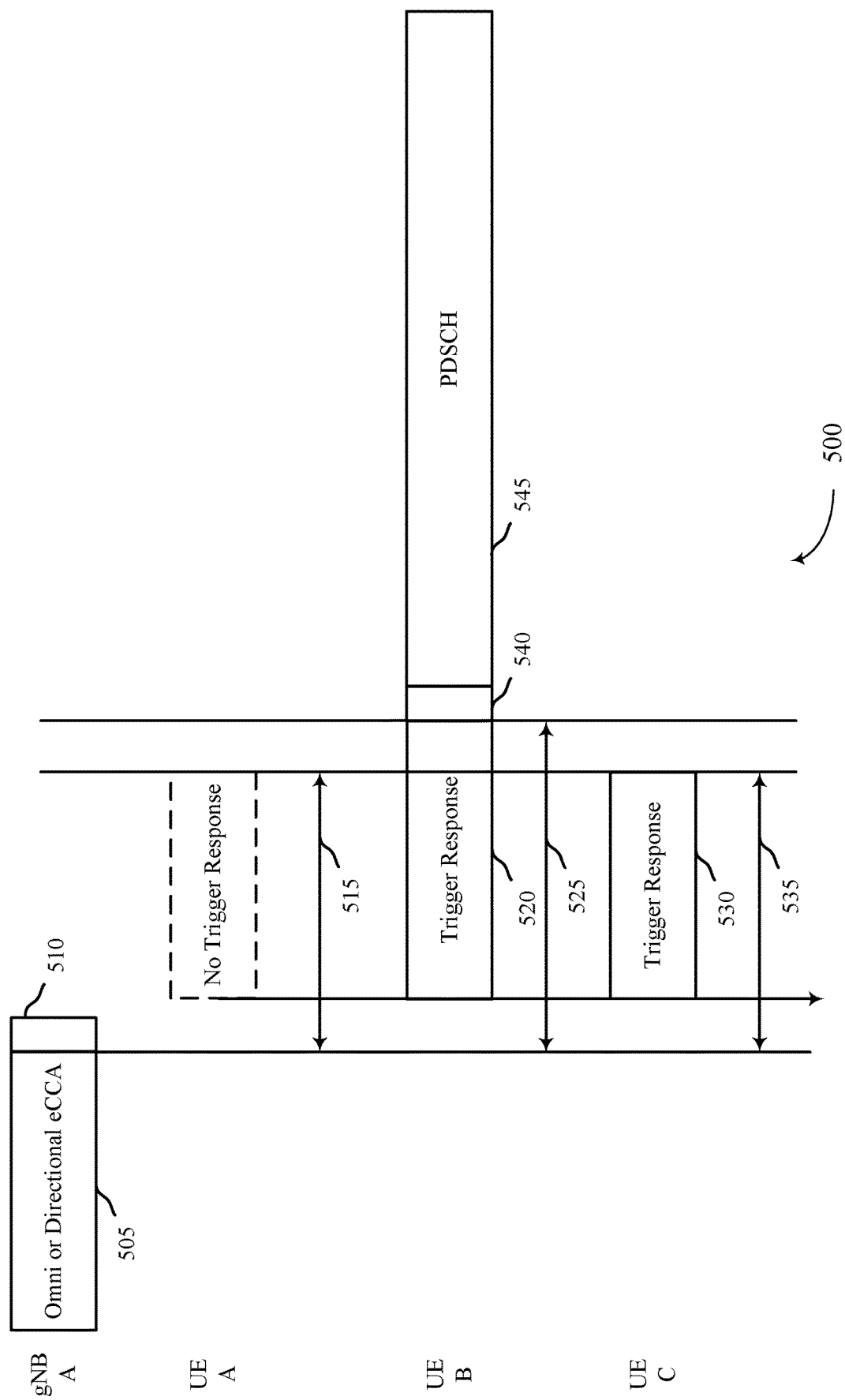
FIG. 5 illustrates an example of a medium reservation scheme that supports medium reservation using energy detection and receiver assisted clear channel assessment in accordance with aspects of the present disclosure.

FIG. 5 illustrates an example of a medium reservation scheme 500 that supports medium reservation using energy detection and receiver assisted clear channel assessment in accordance with aspects of the present disclosure. In some examples, medium reservation scheme 500 may implement aspects of wireless communication system 100 and/or medium reservation schemes 200/300/400. Aspects of medium reservation scheme 500 may be implemented by a base station and/or a UE, which may be examples of the corresponding devices described herein. In some aspects, medium reservation scheme 500 may be implemented in a wireless communication system, such as a mmW wireless network. In some aspects, medium reservation scheme 500 illustrates a receiver energy detection based scheme where the wireless communication network is not synchronized (e.g., asynchronous).

Generally, a base station (identified as gNB A) and one or more UEs (identified as UE A, UE B, and UE C) may be operating in a shared or unlicensed radio frequency spectrum band. In some aspects, the base station and UEs may be operating in a mmW network or other network. The base station may determine that it has a downlink transmission(s) to perform to one or more of the UEs. In some aspects, the base station may begin performing a CCA procedure 505 on a channel of the shared radio frequency spectrum band. As the wireless communication network is asynchronous, the base station may begin performing the CCA procedure 505 without regard to a sensing boundary. In some aspects, the CCA procedure 505 may be an LBT procedure, such as an extended CCA procedure or a short CCA procedure. In some aspects, the CCA procedure 505 may be an omni-directional CCA procedure or a directional CCA procedure.

Based on the result of the CCA procedure 505 being successful, the base station may transmit a multi-UE trigger signal 510, which includes or otherwise conveys an indication that the base station has obtained access to the shared radio frequency spectrum band in order to perform a downlink transmission to one or more of the UE(s). In some aspects, the multi-UE trigger signal 510 may carry or otherwise convey an indication of a time period associated with the downlink transmission for the particular UE (e.g., a time period 515 for UE A, a time period 525 for UE B, and a time period 535 for UE C). For example, the multi-UE trigger signal 510 may include or convey an indication of a K4 value for the respective UE. In some aspects, the time period may, for the UE, identify the time of a scheduled beginning of the downlink transmission for the respective UE. In some aspects, the K4 value may be associated with the gap between the multi-UE trigger signal 510 and the beginning of the downlink transmission (e.g., transmission of control information for the respective downlink transmission).

In some aspects, the multi-UE trigger signal 510 may be for one or more of the UE(s) (e.g., may be configured such that the intended UE(s) (e.g., UE B and UE C) for the downlink transmission can identify or otherwise determine that the multi-UE trigger signal 510 is intended for it). For example, the multi-UE trigger signal 510 may be transmitted using a waveform configuration that is associated with the intended UE(s), such that the corresponding UE(s) can identify the waveform configuration and determine that the multi-UE trigger signal 510 is intended for it. For example, the waveform may be based on an identifier of the UE, a common identifier for the intended UEs, and the like. As another example, one or more bits, fields, and the like, of the multi-UE trigger signal 510 may be scrambled using an identifier of the intended UE(s), such that the respective UE can descramble or otherwise decode the multi-UE trigger signal 510 to determine that the multi-UE trigger signal 510 is intended for it. In some aspects, the multi-UE trigger signal 510 may be conveyed or otherwise indicated in a MAC CE, a DCI, and the like.

In response to the multi-UE trigger signal 510, one or more of the UEs may transmit a trigger response signal. For example, and as is illustrated in FIG. 5, UE A may not transmit a trigger response signal, UE B may transmit a trigger response signal 520, and UE C may transmit a trigger response signal 530. In some aspects, each of the trigger response signals may be configured to reserve the channel of the shared radio frequency spectrum band for the corresponding downlink transmission. For example, the trigger response signal 520 may be transmitted for some or all of the time period 525 for UE B, and the trigger response signal 530 may be transmitted for some or all of the time period 535 for UE C. For example, the respective UE may identify the beginning of the downlink transmission (e.g., based at least in part on the multi-UE trigger signal 510) and may transmit their respective trigger response signals until the beginning of their corresponding scheduled downlink transmissions. In some aspects, this may include the UE identifying the delay between receiving the multi-UE trigger signal 510 and the scheduled beginning of their respective downlink transmissions, and deducting the delay period from the time period. In some aspects, the UE(s) may be preconfigured with their respective time periods (e.g., during initial connection set up with the base station), or may receive an indication of the time period in the multi-UE trigger signal 510. For example, when preconfigured with the time period, the UE(s) may receive the indication of the time period prior to receiving the multi-UE trigger signal 510.

In some aspects, the respective trigger response signals may reserve the channel until the beginning of the corresponding downlink transmission for the corresponding UE. For example, the trigger response signals may provide a threshold amount of energy on the channel such that other devices performing a CCA procedures detect the trigger response signals and determine that the channel is unavailable. Accordingly, the trigger response signals transmitted by the respective UEs may provide a UE-assisted mechanism where the channel can be reserved for the base station to perform a downlink transmission to the UEs.

In some aspects, each of the respective trigger response signals may be configured in such a manner that the base station recognizes the trigger response signals coming from the corresponding UE (e.g., rather than from some other device transmitting on the channel). For example, the trigger response signals may be transmitted using a waveform configuration that is associated with the transmitting UE (e.g., based on an identifier of the UE), and can therefore be recognized by the base station. Thus, while the trigger response signal may be recognizable between the UE and the base station, other devices attempting to operate on the channel of the shared radio frequency spectrum band may only detect energy on the channel and therefore determine that the channel is unavailable.

In some aspects, and the base station may receive one or more trigger response signals and determine or otherwise identify one or more UEs to perform the downlink transmission to. In the example of FIG. 5, the base station may select UE B to perform the downlink transmission to. Accordingly, the base station may begin the downlink transmission to UE B by transmitting control information 540 (e.g., PDCCH), which carries or otherwise provides an indication of the grant of resources for the downlink transmission. The base station may continue the downlink transmission to UE B by transmitting data 545 (e.g., PDSCH), to UE B. Therefore, the base station may be able to transmit the control information 540 to UE B at the scheduled beginning of the downlink transmission.

Figure 6:
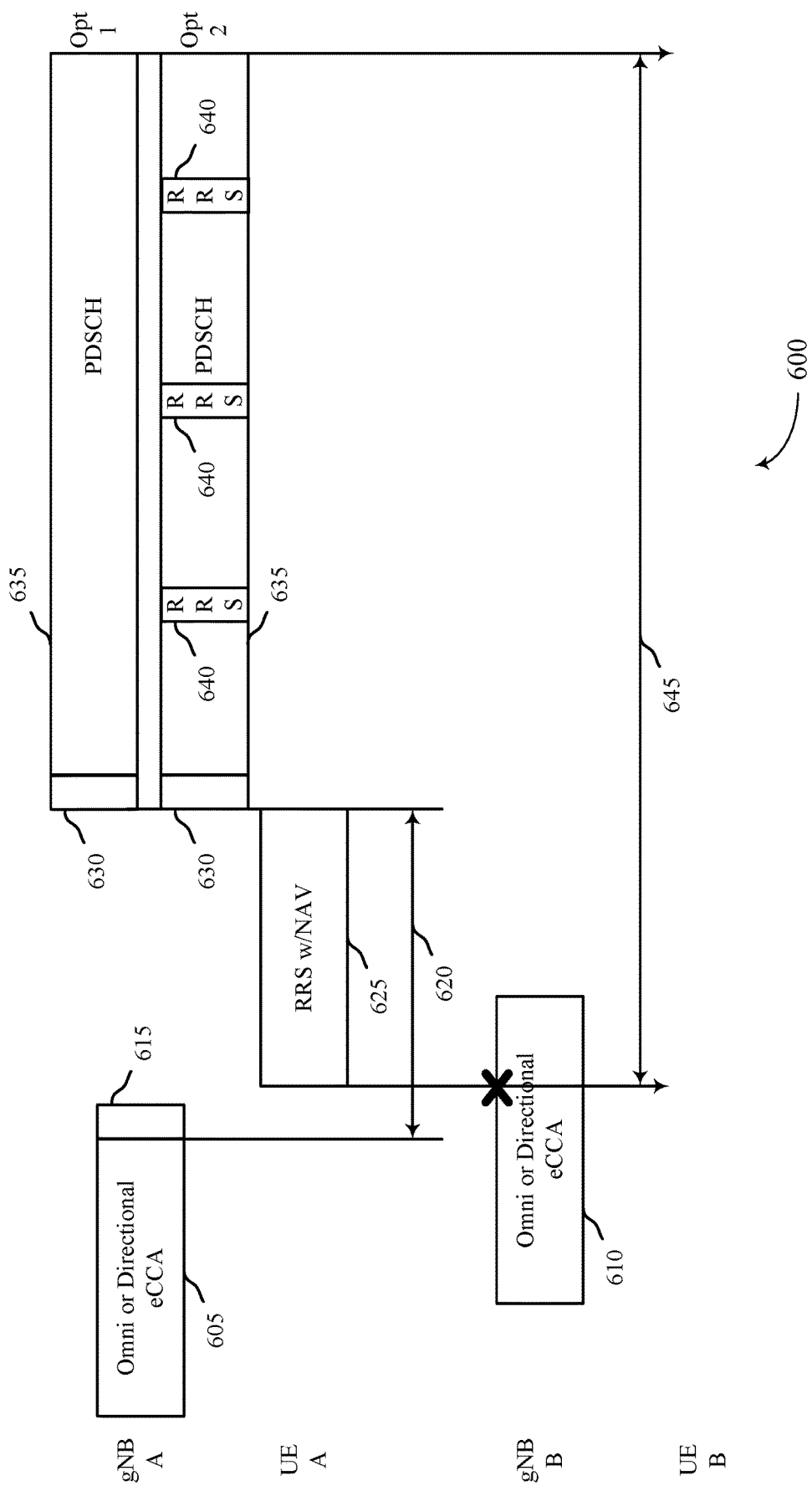
FIG. 6 illustrates an example of a medium reservation scheme that supports medium reservation using energy detection and receiver assisted clear channel assessment in accordance with aspects of the present disclosure.

FIG. 6 illustrates an example of a medium reservation scheme 600 that supports medium reservation using energy detection and receiver assisted clear channel assessment in accordance with aspects of the present disclosure. In some examples, medium reservation scheme 600 may implement aspects of wireless communication system 100 and/or medium reservation schemes 200/300/400/500. Aspects of medium reservation scheme 600 may be implemented by a base station and/or a UE, which may be examples of the corresponding devices described herein. In some aspects, medium reservation scheme 600 may be implemented in a wireless communication system, such as a mmW wireless network. In some aspects, medium reservation scheme 600 illustrates a receiver assisted message based scheme where the wireless communication network is not synchronized (e.g., asynchronous).

Generally, a base station (identified as gNB A) and UE (identified as UE A) may be operating in a shared or unlicensed radio frequency spectrum band. In some aspects, the base station and UE may be operating in a mmW network or other network. The base station may determine that it has a downlink transmission to perform to the UE. In some aspects, the base station may begin performing a CCA procedure 605 on a channel of the shared radio frequency spectrum band. As the wireless communication network is asynchronous, the base station may begin performing the CCA procedure 605 without regard to a sensing boundary, at least with respect to a second base station (identified as gNB B). In some aspects, the CCA procedure 605 may be an LBT procedure, such as an extended CCA procedure or a short CCA procedure. In some aspects, the CCA procedure 605 may be an omni-directional CCA procedure or a directional CCA procedure.

In some aspects, the second base station (e.g., gNB B) may also have a downlink transmission to perform to a second UE (identified as UE B). Accordingly, the second base station may begin its own CCA procedure 610. However, as the wireless communication network is asynchronous, the second base station may begin its CCA procedure 610 later in time than the CCA procedure 605.

Based on the result of the CCA procedure 605 being successful, the base station may transmit a trigger signal 615, which includes or otherwise conveys an indication that the base station has obtained access to the shared radio frequency spectrum band in order to perform a downlink transmission to the UE. In some aspects, the trigger signal 615 may include or otherwise convey an indication of a reservation request (RRQ) message. In some aspects, the trigger signal 615 may carry or otherwise convey an indication of a time period 620 associated with the downlink transmission (e.g., a K4 value) for the UE. In some aspects, the time period 620 may, for the UE, identify the time or a scheduled beginning of the downlink transmission for the UE. In some aspects, the K4 value may be associated with the gap between the trigger signal 615 and the beginning of the downlink transmission (e.g., transmission of control information for the downlink transmission).

In some aspects, the trigger signal 615 may be for the UE (e.g., the trigger signal 615 may be configured such that the intended UE (e.g., UE A) for the downlink transmission can identify or otherwise determine that the trigger signal 615 is intended for it). For example, the trigger signal 615 may be transmitted using a waveform configuration that is associated with the UE, such that the UE can identify the waveform configuration and determine that the trigger signal 615 is for it. For example, the waveform may be based on an identifier of the UE. As another example, one or more bits, fields, and the like, of the trigger signal 615 may be scrambled using an identifier of the UE, such that the UE can descramble or otherwise decode the trigger signal 615 to determine that the trigger signal 615 is for it. In some aspects, the trigger signal 615 may be conveyed or otherwise indicated in a MAC CE, a DCI, and the like.

In some aspects, the second base station (e.g., gNB B) may not be close enough to receive the trigger signal 615. Accordingly, the trigger signal 415 may not be detected during the CCA procedure 610 of the second base station.

In response to the trigger signal 615, the UE may transmit a trigger response signal 625 that is configured to reserve the channel of the shared radio frequency spectrum band for the downlink transmission. In some aspects, the trigger response signal 625 may include or otherwise convey an indication of a reservation response signal (RRS) message that is configured to include or convey an indication of a network allocation vector (NAV). For example, the trigger response signal 625 may be transmitted for some or all of the time period 620. For example, the UE may identify the beginning of the downlink transmission (e.g., based at least in part on the trigger signal 615), and may transmit the trigger response signal 625 until the beginning of the scheduled downlink transmission. In some aspects, this may include the UE identifying the delay between receiving the trigger signal 615 and the scheduled beginning of the downlink transmission, and deducting the delay period from the time period 620. In some aspects, the UE may be preconfigured with the time period 620 (e.g., during initial connection set up with the base station), or may receive an indication of the time period 620 in the trigger signal 615. For example, when preconfigured with the time period 620, the UE may receive the indication of the time period 620 prior to receiving the trigger signal 615.

In some aspects, the NAV may include or otherwise provide an indication of a duration for the trigger response signal 625. For example, the NAV may identify the time and/or in amount of data to be communicated that signals to other wireless devices receiving the trigger response signal 625 that the channel and the shared radio frequency spectrum band is occupied or busy for a duration according to the NAV.

In some aspects, the trigger response signal 625 may reserve the channel until the beginning of the downlink transmission for the UE. For example, the trigger response signal 625 may provide a threshold amount of energy on the channel such that other devices performing a CCA procedures detect the trigger response signal 625 and determine that the channel is unavailable. As illustrated in FIG. 6, the trigger response signal 625 may be detected by the second base station during its CCA procedure 610, and therefore the second base station may determine that the result of its CCA procedure 610 is unsuccessful. Accordingly, the second base station may delay its downlink transmission to the second UE (e.g., UE B). Accordingly, the trigger response signal 625 transmitted by the UE may provide a UE-assisted mechanism where the channel can be reserved for the base station to perform a downlink transmission to the UE. That is, the trigger response signal 625 (e.g., the NAV) may act at as a medium reservation signal to block other sensing nodes (e.g., potential other transmitters) from capturing the channel and interrupting the downlink transmission.

In some aspects, the trigger response signal 625 may be configured in such a manner that the base station recognizes the trigger response signal 625 as coming from the UE (e.g., rather than from some other device transmitting on the channel). For example, the trigger response signal 625 may be transmitted using a waveform configuration that is associated with the UE (e.g., based on an identifier of the UE), and can therefore be recognized by the base station. Thus, while the trigger response signal 625 may be recognizable between the UE and the base station, other devices attempting to operate on the channel of the shared radio frequency spectrum band may only detect energy on the channel and therefore determine that the channel is unavailable.

The base station may begin the downlink transmission to the UE by transmitting control information 630 (e.g., PDCCH), which carries or otherwise provides an indication of the grant of resources for the downlink transmission. The base station may continue the downlink transmission to the UE by transmitting data 635 (e.g., PDSCH), to the UE. Therefore, the base station may be able to transmit the control information 630 to the UE at the scheduled beginning of the downlink transmission.

In some aspects, two options are illustrated with regard to protecting the downlink transmission to the UE in terms of medium reservation. In a first option (identified as Option 1), the base station may simply transmit the data 635 to the UE during the downlink transmission. In a second option (identified as Option 2), the UE may transmit one or more instances of a repeat trigger response (RTR) 640, which may also be referred to a RRS message, during the downlink transmission. In some aspects, each instance of the RTR 640 may include or otherwise convey an indication of a NAV. For example, the NAV may include one or more bits, fields, and the like, that signal a time period and/or amount of data to be used by other devices receiving the RTR 640 to determine that the channel is occupied for a certain duration. In some aspects, each instance of the RTR 640 may be configured such that the NAV reserves the channel until the next instance of the RTR 640. In other aspects, each instance of the RTR 640 may be configured such that the NAV reserves a channel for the duration of the downlink transmission. In some aspects, the RTR 640 may increase the chances of blocking the second base station (e.g., gNB B) from attempting to capture the channel during the downlink transmission. For example, as the second base station is within range of the UE (e.g., UE A), the one or more instances of the RTR 640 transmitted by the UE during the downlink transmission serves to reserve the channel and avoid interruption of the downlink transmission. In some aspects, the one or more instances of the RTR 640 may be transmitted according to a configuration, periodicity, duty cycle, and the like that is known by the base station and the UE. For example, the base station may know the information for the RTR 640 transmitted by the UE, and may therefore pause transmitting the data 635 to allow the UE to transmit the RTR 640. In some aspects, a downlink transmission may continue until the next sensing boundary. In some aspects, a duration 645 between each sensing boundary may be defined or otherwise determined by the NAV included in the trigger response signal 625 and/or the RTR 640.

Figure 7:
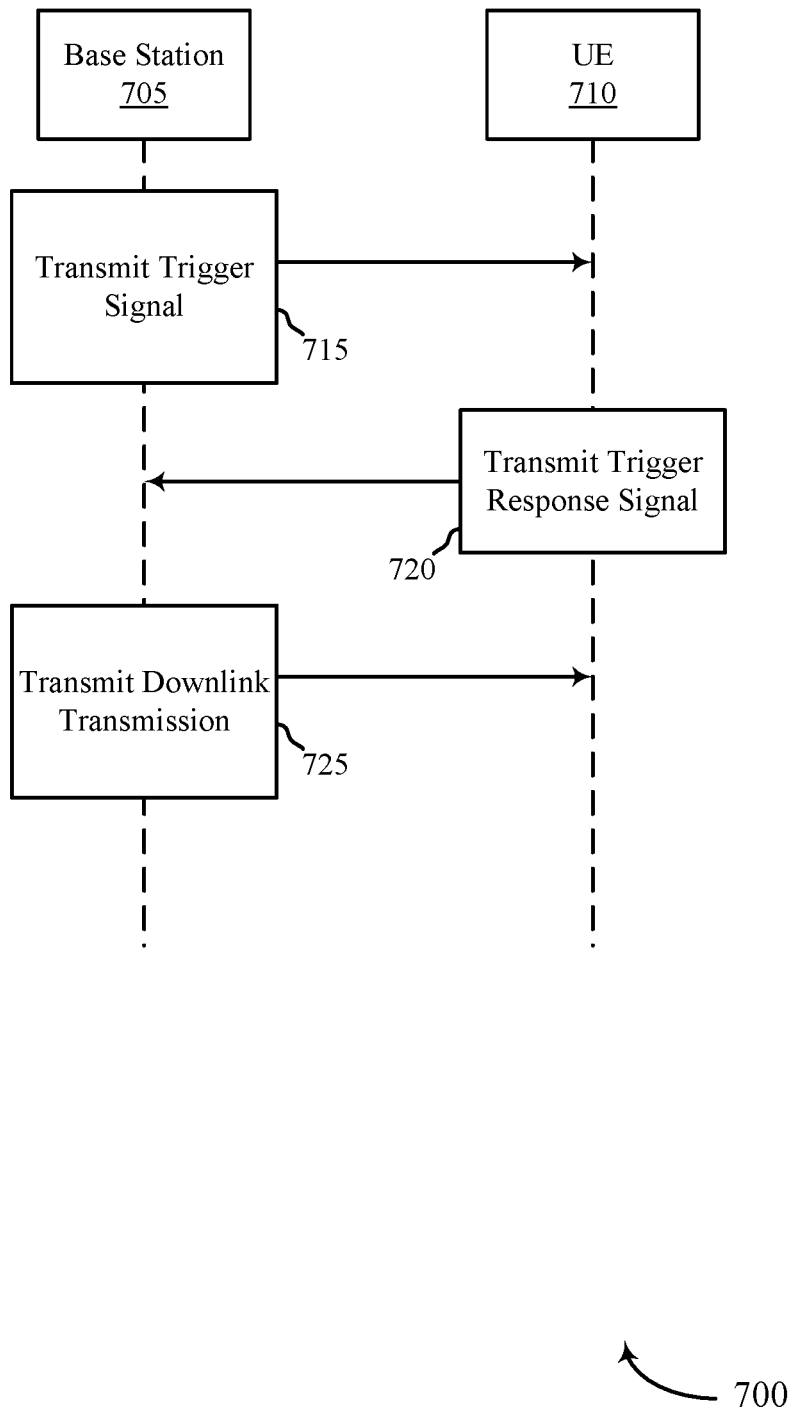
FIG. 7 illustrates an example of a process that supports medium reservation using energy detection and receiver assisted clear channel assessment in accordance with aspects of the present disclosure.

FIG. 7 illustrates an example of a process 700 that supports medium reservation using energy detection and receiver assisted clear channel assessment in accordance with aspects of the present disclosure. In some examples, process 700 may implement aspects of wireless communication system 100 and/or medium reservation schemes 200/300/400/500/600. Aspects of process 700 may be implemented by a base station 705 and/or a UE 710, which may be examples of corresponding devices described herein.

At 715, base station 705 may transmit (and UE 710 may receive) a trigger signal. In some aspects, the trigger signal may carry or otherwise provide an indication that base station 705 has obtained access to a shared radio frequency spectrum band to perform a downlink transmission to UE 710.

In some aspects, this may include base station 705 performing a CCA procedure to obtain the access to the shared radio frequency spectrum band (e.g., an omni-directional CCA procedure or a directional CCA procedure).

In some aspects, this may include base station 705 configuring the trigger signal to indicate that the base station 705 has obtained access to the shared radio frequency spectrum band for downlink transmissions to a plurality of UEs. In some aspects, base station 705 may receive a trigger response signals from some (e.g., a subset) or all of the plurality of UEs and select one or more of the UEs to perform the downlink transmission(s) to.

At 720, UE 710 may transmit (and base station 705 may receive) a trigger response signal. In some aspects, the trigger response signal may be transmitted in response to the trigger signal. In some aspects, the trigger response signal may be configured or otherwise operate to reserve a channel of the shared radio frequency spectrum band for the downlink transmission by a base station 705. For example, the trigger response signal may be transmitted for a time period that extends to the beginning of the downlink transmission.

In some aspects, this may include UE 710 selecting a waveform for transmitting the trigger response signal based at least in part on the identifier associated with UE 710. In some aspects, this may include UE 710 identifying a delay period between receiving the trigger signal and the scheduled beginning of the downlink transmission, the time period may be based at least in part on the delay period. In some aspects, base station 705 may transmit (and UE 710 may receive) a configuration signal indicating the delay period prior to the trigger signal.

In some aspects, this may include base station 705 determining, based at least in part on a waveform used for the trigger response signal, an identifier associated with UE 710.

At 725, base station 705 may transmit (and UE 710 may receive) a downlink transmission. In some aspects, base station 705 may transmit a downlink transmission after an expiration of the time period and based at least in part on the trigger signal. In some aspects, the downlink transmission may include control information and/or data transmitted to UE 710.

In some aspects, this may include UE 710 transmitting one or more instances of a repeat trigger response signal over the channel during a scheduled period of the downlink transmission. In some aspects, the trigger response signal may include a RRS message that includes a NAV of the RRS message that is set based at least in part on the time period.

Figure 8:
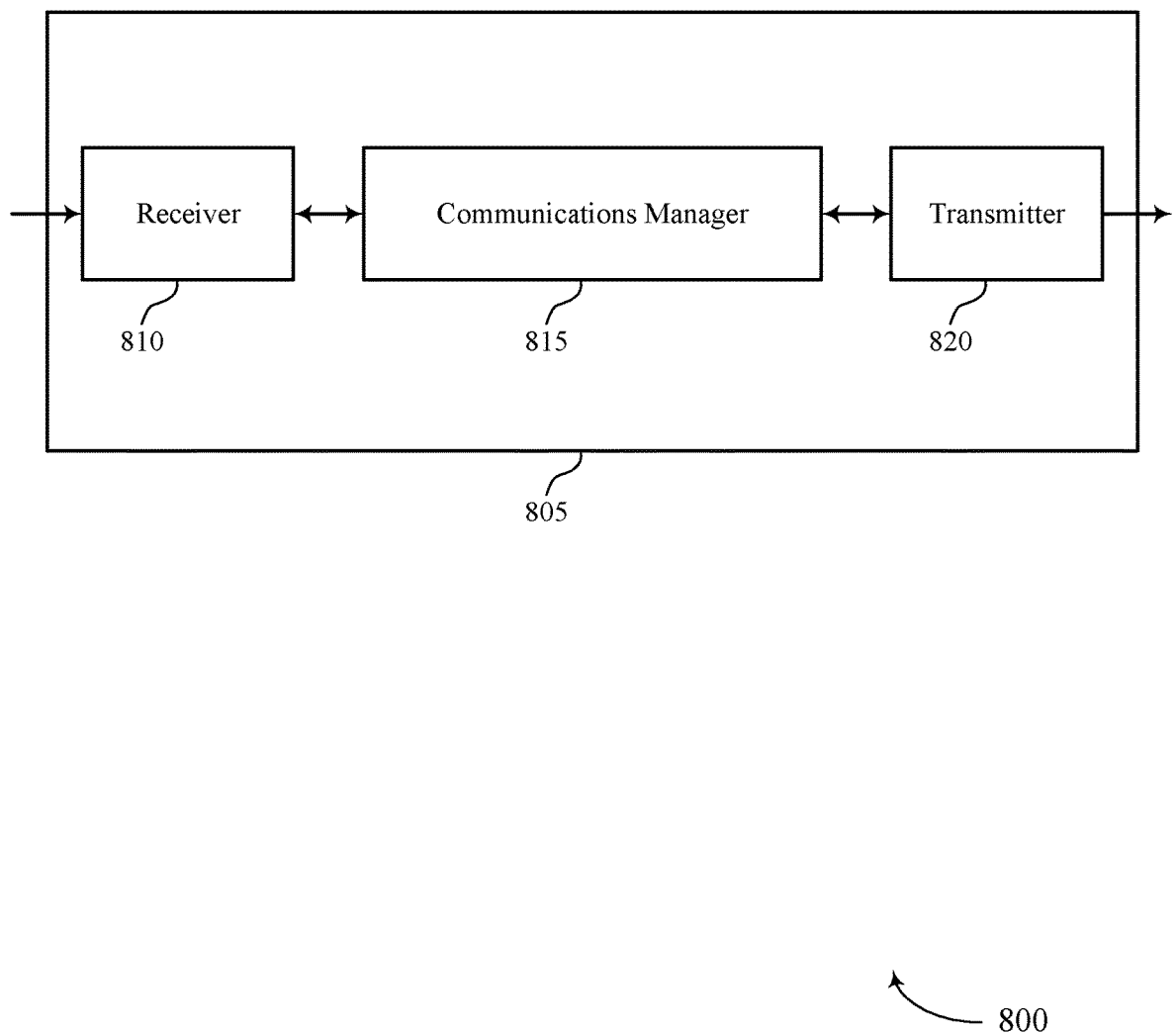
FIGS. 8 and 9 show block diagrams of devices that support medium reservation using energy detection and receiver assisted clear channel assessment in accordance with aspects of the present disclosure.

FIG. 8 shows a block diagram 800 of a device 805 that supports medium reservation using energy detection and receiver assisted clear channel assessment in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to medium reservation using energy detection and receiver assisted clear channel assessment, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a trigger signal indicating that a base station has obtained access to a shared radio frequency spectrum band, transmit, in response to the trigger signal, a trigger response signal configured to reserve a channel of the shared radio frequency spectrum band for a downlink transmission by the base station, where the trigger response signal is transmitted for a time period extending to a scheduled beginning of the downlink transmission, and receive the downlink transmission after an expiration of the time period and based on the trigger signal. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In some examples, communications manager 815 may be implemented as an integrated circuit or chipset for a mobile device modem, and the receiver 810 and transmitter 820 may be implemented as analog components (e.g., amplifiers, filters, antennas, etc.) coupled with the mobile device modem to enable wireless transmission and reception.

The communications manager 815 as described herein may be implemented to realize one or more potential advantages. Various implementations may enable a mechanism where a communications channel may be captured and/or reserved for a time period to perform such communications. At least one implementation may enable the communications manager 815 to effectively coordinate reserving a channel for use.

Based on implementing the channel capture techniques as described herein, one or more processors of the device 805 (e.g., processor(s) controlling or incorporated with one or more of receiver 810, communications manager 815, and transmitter 820) may reduce an amount of time required to effectively capture or reserve a communications channel. In addition, only one device (e.g., a UE 115 or base station 105 as described herein) may need perform channel sensing, instead of both devices, which may save power and processing time at one or both devices.

Figure 9:
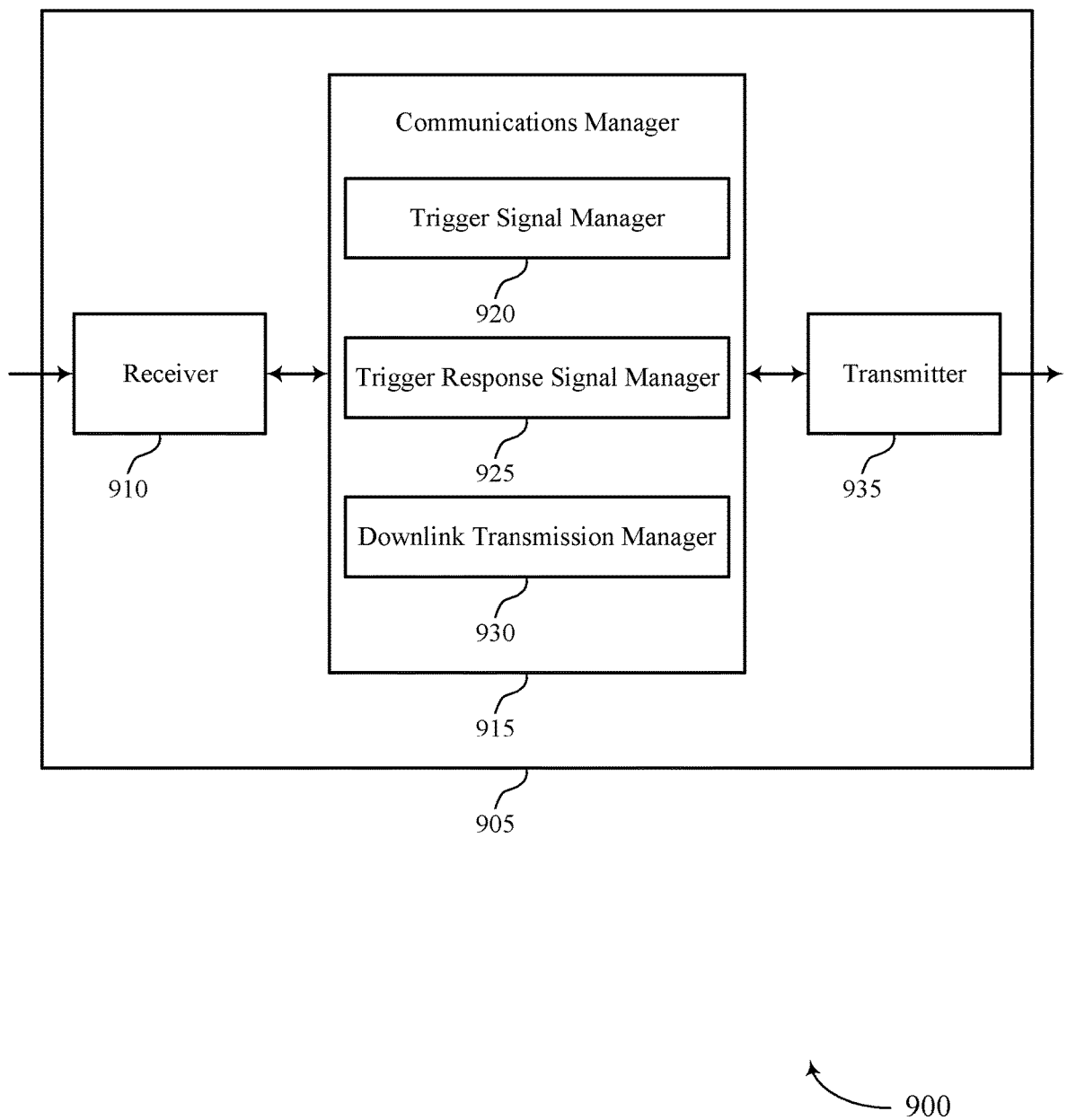

FIG. 9 shows a block diagram 900 of a device 905 that supports medium reservation using energy detection and receiver assisted clear channel assessment in accordance with aspects of the present disclosure. The device 905 may be an example of aspects of a device 805 or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to medium reservation using energy detection and receiver assisted clear channel assessment, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a trigger signal manager 920, a trigger response signal manager 925, and a downlink transmission manager 930. The communications manager 915 may be an example of aspects of the communications manager 1110 described herein.

The trigger signal manager 920 may receive a trigger signal indicating that a base station has obtained access to a shared radio frequency spectrum band.

The trigger response signal manager 925 may transmit, in response to the trigger signal, a trigger response signal configured to reserve a channel of the shared radio frequency spectrum band for a downlink transmission by the base station, where the trigger response signal is transmitted for a time period extending to a scheduled beginning of the downlink transmission.

The downlink transmission manager 930 may receive the downlink transmission after an expiration of the time period and based on the trigger signal.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
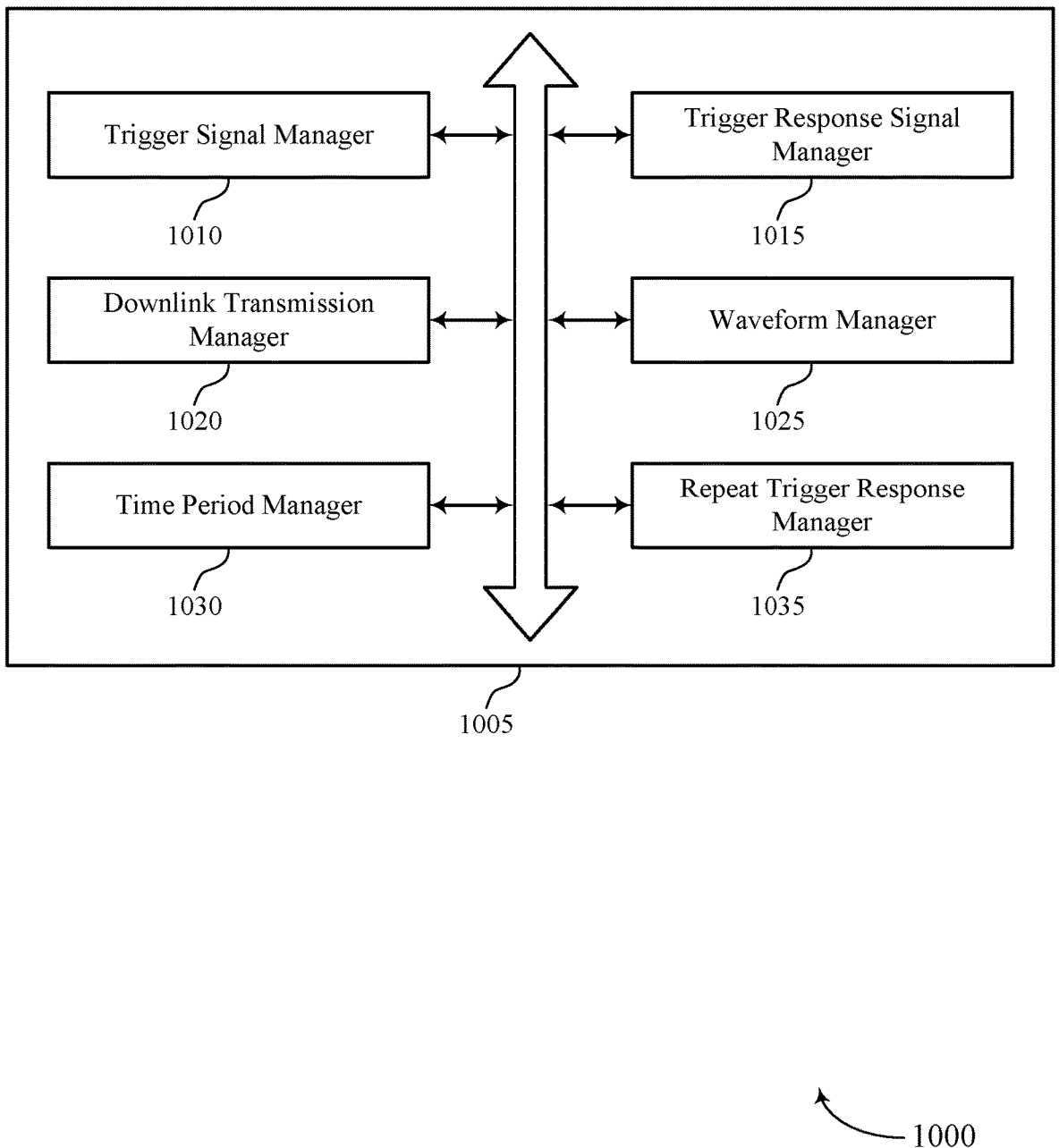
FIG. 10 shows a block diagram of a communications manager that supports medium reservation using energy detection and receiver assisted clear channel assessment in accordance with aspects of the present disclosure.

FIG. 10 shows a block diagram 1000 of a communications manager 1005 that supports medium reservation using energy detection and receiver assisted clear channel assessment in accordance with aspects of the present disclosure. The communications manager 1005 may be an example of aspects of a communications manager 815, a communications manager 915, or a communications manager 1110 described herein. The communications manager 1005 may include a trigger signal manager 1010, a trigger response signal manager 1015, a downlink transmission manager 1020, a waveform manager 1025, a time period manager 1030, and a repeat trigger response manager 1035. Each of these modules may communicate, directly or indirectly, with one another (e.g., via one or more buses).

The trigger signal manager 1010 may receive a trigger signal indicating that a base station has obtained access to a shared radio frequency spectrum band.

The trigger response signal manager 1015 may transmit, in response to the trigger signal, a trigger response signal configured to reserve a channel of the shared radio frequency spectrum band for a downlink transmission by the base station, where the trigger response signal is transmitted for a time period extending to a scheduled beginning of the downlink transmission.

The downlink transmission manager 1020 may receive the downlink transmission after an expiration of the time period and based on the trigger signal.

The waveform manager 1025 may select a waveform for transmitting the trigger response signal based on an identifier associated with the UE.

The time period manager 1030 may identify a delay period between receiving the trigger signal and the scheduled beginning of the downlink transmission, where the time period is based on the delay period. In some examples, the time period manager 1030 may receive, prior to receiving the trigger signal, a configuration signal indicating the delay period.

The repeat trigger response manager 1035 may transmit, during a scheduled period of the downlink transmission, one or more instances of a repeat trigger response signal over the channel of the shared radio frequency spectrum band. In some examples, the repeat trigger response manager 1035 may set a NAV of the RRS based on the time period.

Figure 11:
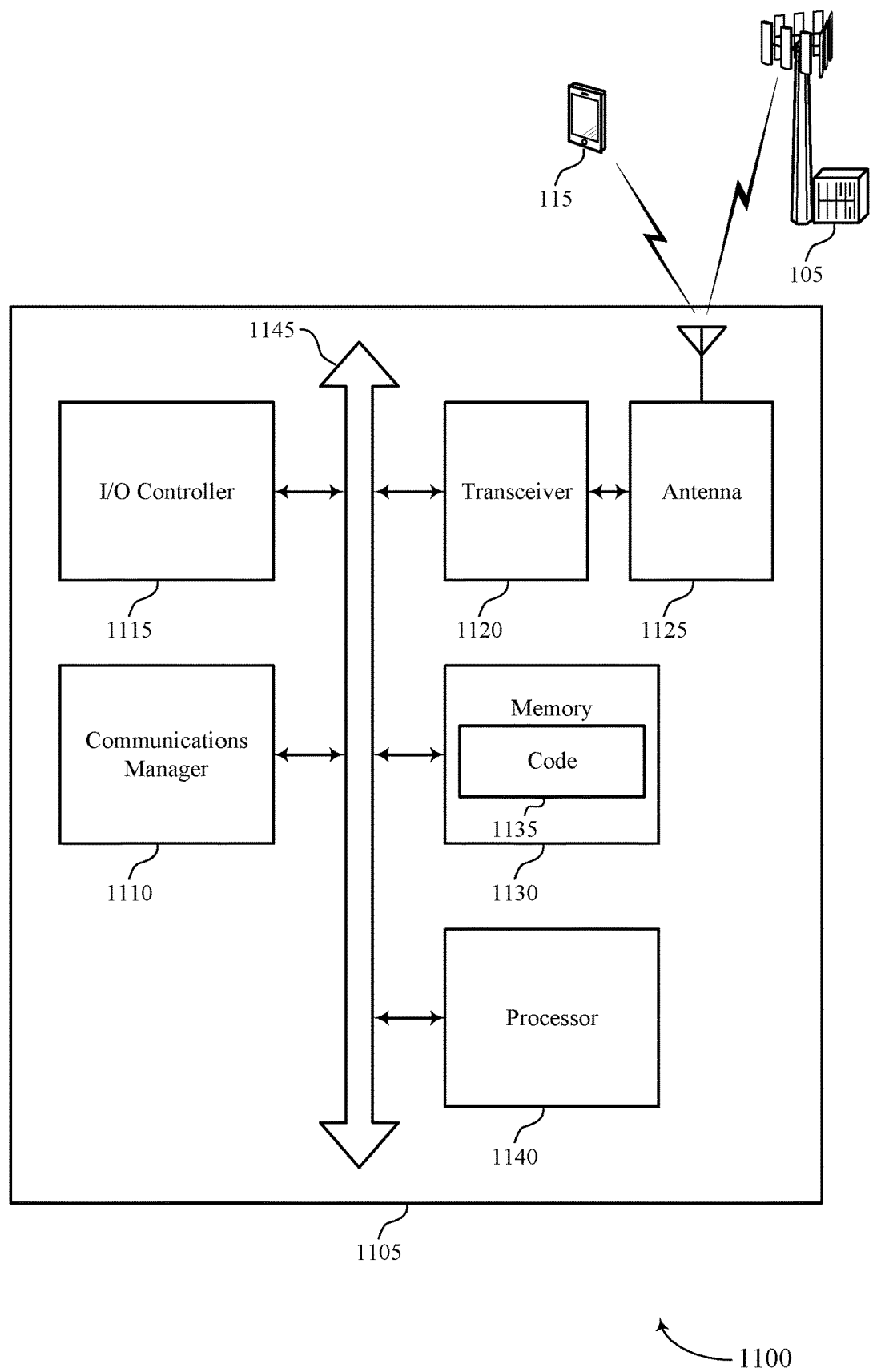
FIG. 11 shows a diagram of a system including a device that supports medium reservation using energy detection and receiver assisted clear channel assessment in accordance with aspects of the present disclosure.

FIG. 11 shows a diagram of a system 1100 including a device 1105 that supports medium reservation using energy detection and receiver assisted clear channel assessment in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a trigger signal indicating that a base station has obtained access to a shared radio frequency spectrum band, transmit, in response to the trigger signal, a trigger response signal configured to reserve a channel of the shared radio frequency spectrum band for a downlink transmission by the base station, where the trigger response signal is transmitted for a time period extending to a scheduled beginning of the downlink transmission, and receive the downlink transmission after an expiration of the time period and based on the trigger signal.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting medium reservation using energy detection and receiver assisted clear channel assessment).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
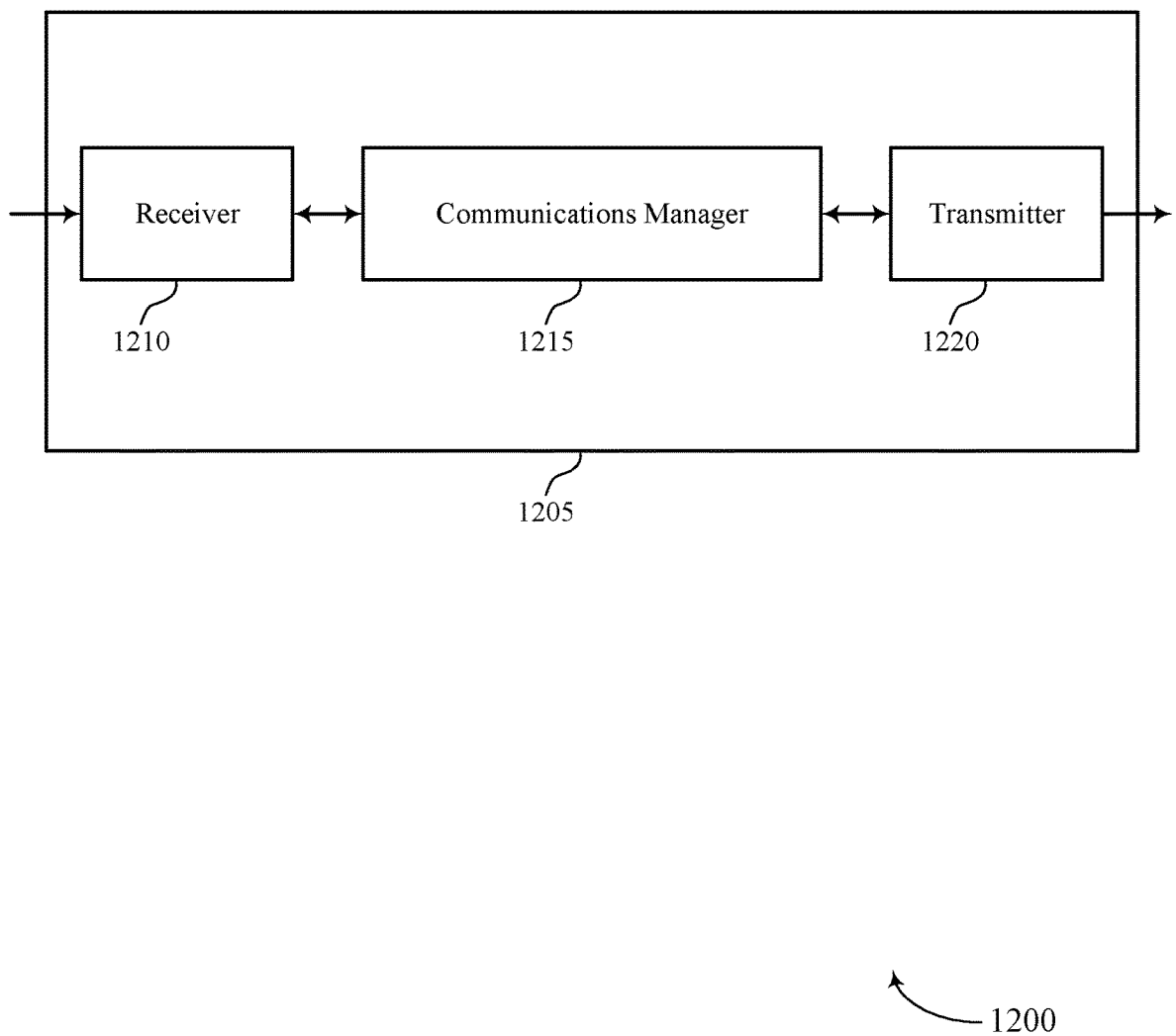
FIGS. 12 and 13 show block diagrams of devices that support medium reservation using energy detection and receiver assisted clear channel assessment in accordance with aspects of the present disclosure.

FIG. 12 shows a block diagram 1200 of a device 1205 that supports medium reservation using energy detection and receiver assisted clear channel assessment in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to medium reservation using energy detection and receiver assisted clear channel assessment, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit a trigger signal to a UE indicating that the base station has obtained access to a shared radio frequency spectrum band for a downlink transmission to the UE, receive, based on the trigger signal, a trigger response signal configured to reserve the channel of the shared radio frequency spectrum band for the downlink transmission, where the trigger response signal is received for a time period extending to a scheduled beginning of the downlink transmission, and transmit the downlink transmission after an expiration of the time period and based on the trigger signal. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
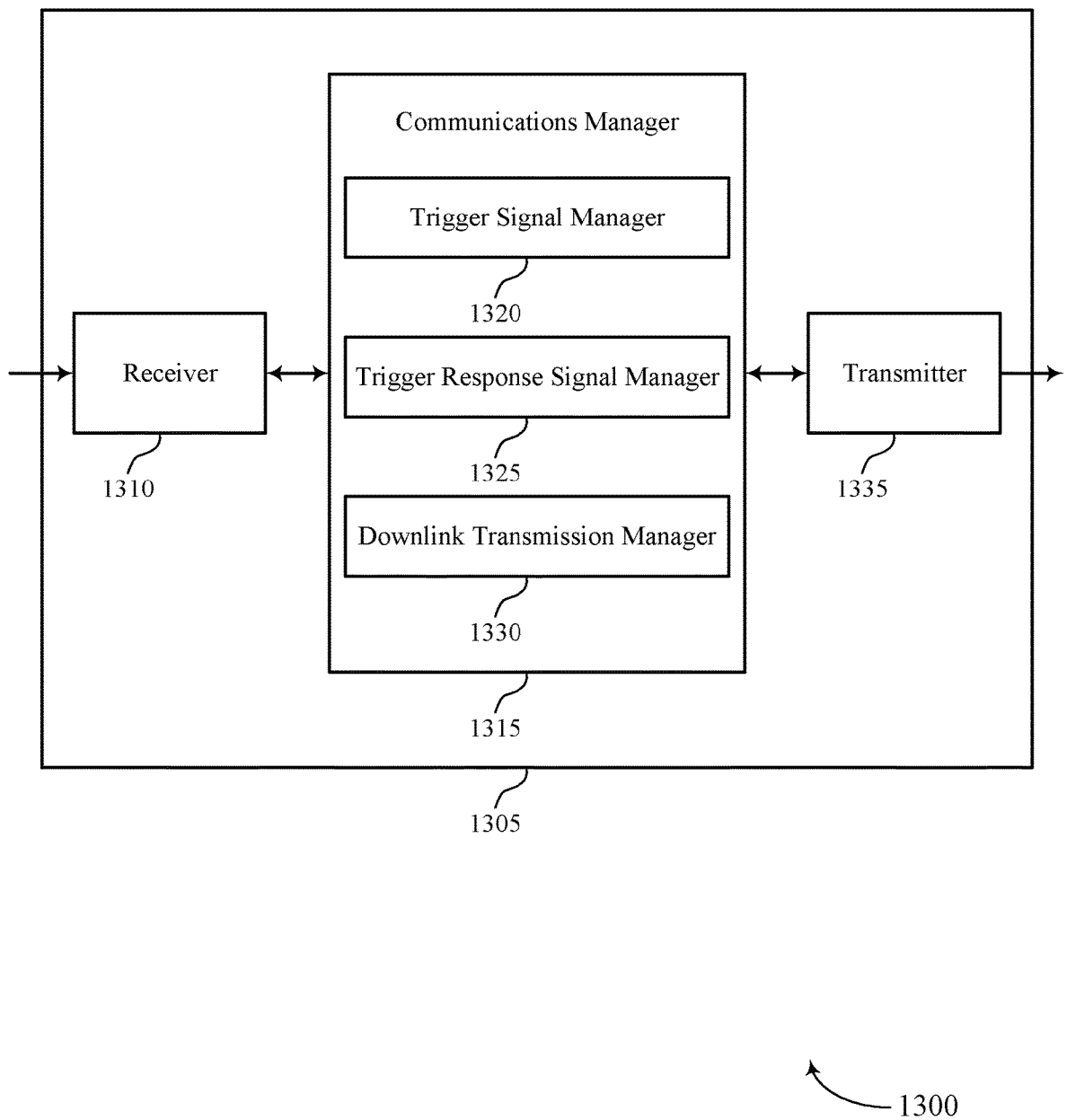

FIG. 13 shows a block diagram 1300 of a device 1305 that supports medium reservation using energy detection and receiver assisted clear channel assessment in accordance with aspects of the present disclosure. The device 1305 may be an example of aspects of a device 1205 or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to medium reservation using energy detection and receiver assisted clear channel assessment, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a trigger signal manager 1320, a trigger response signal manager 1325, and a downlink transmission manager 1330. The communications manager 1315 may be an example of aspects of the communications manager 1510 described herein.

The trigger signal manager 1320 may transmit a trigger signal to a UE indicating that the base station has obtained access to a shared radio frequency spectrum band for a downlink transmission to the UE.

The trigger response signal manager 1325 may receive, based on the trigger signal, a trigger response signal configured to reserve the channel of the shared radio frequency spectrum band for the downlink transmission, where the trigger response signal is received for a time period extending to a scheduled beginning of the downlink transmission.

The downlink transmission manager 1330 may transmit the downlink transmission after an expiration of the time period and based on the trigger signal.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
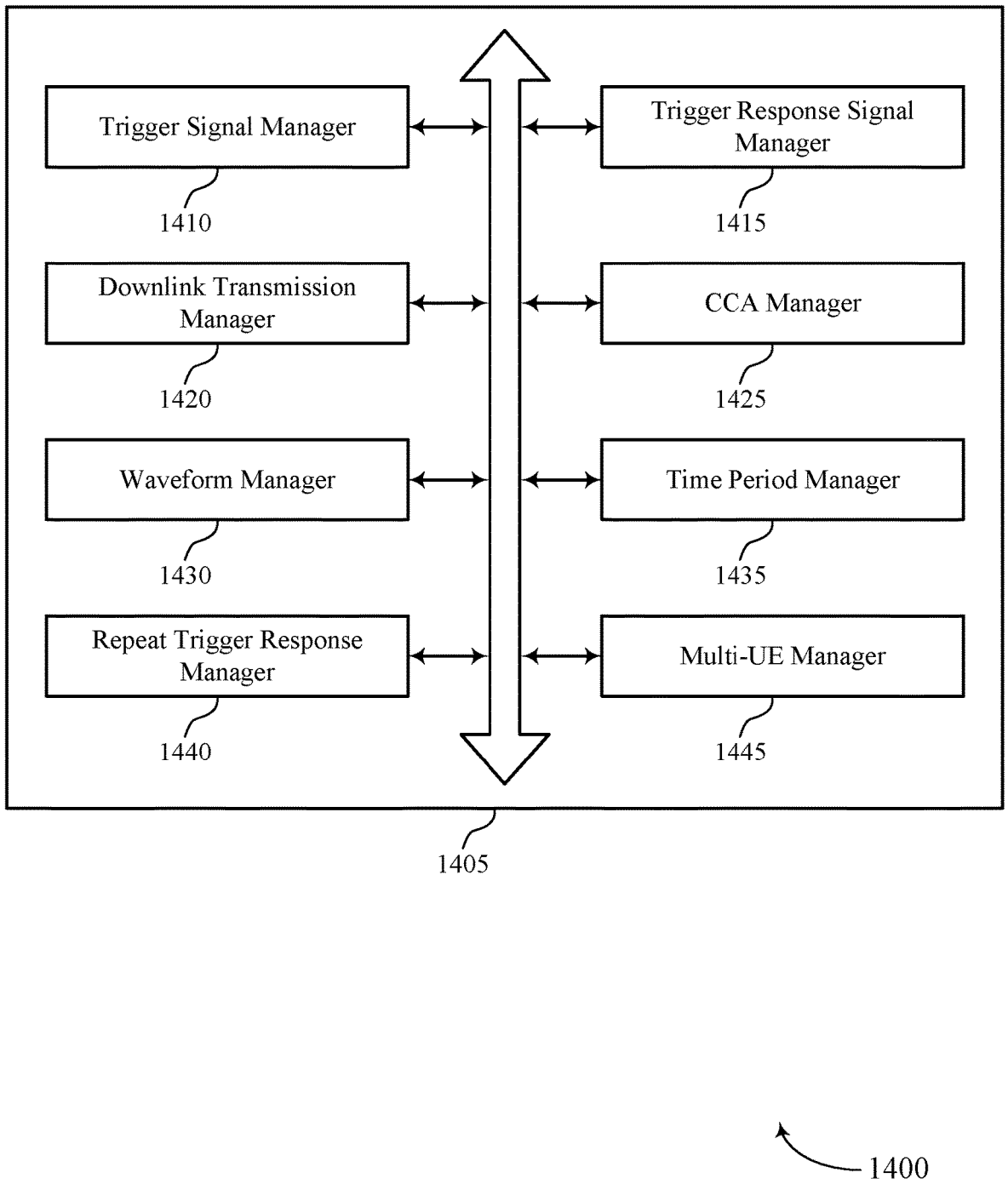
FIG. 14 shows a block diagram of a communications manager that supports medium reservation using energy detection and receiver assisted clear channel assessment in accordance with aspects of the present disclosure.

FIG. 14 shows a block diagram 1400 of a communications manager 1405 that supports medium reservation using energy detection and receiver assisted clear channel assessment in accordance with aspects of the present disclosure. The communications manager 1405 may be an example of aspects of a communications manager 1215, a communications manager 1315, or a communications manager 1510 described herein. The communications manager 1405 may include a trigger signal manager 1410, a trigger response signal manager 1415, a downlink transmission manager 1420, a CCA manager 1425, a waveform manager 1430, a time period manager 1435, a repeat trigger response manager 1440, and a multi-UE manager 1445. Each of these modules may communicate, directly or indirectly, with one another (e.g., via one or more buses).

The trigger signal manager 1410 may transmit a trigger signal to a UE indicating that the base station has obtained access to a shared radio frequency spectrum band for a downlink transmission to the UE.

The trigger response signal manager 1415 may receive, based on the trigger signal, a trigger response signal configured to reserve the channel of the shared radio frequency spectrum band for the downlink transmission, where the trigger response signal is received for a time period extending to a scheduled beginning of the downlink transmission.

The downlink transmission manager 1420 may transmit the downlink transmission after an expiration of the time period and based on the trigger signal.

The CCA manager 1425 may perform a CCA procedure to obtain the access to the shared radio frequency spectrum band, where the CCA procedure includes an omni-directional CCA procedure or a directional CCA procedure.

The waveform manager 1430 may determine, based on a waveform used for the trigger response signal, an identifier associated with the UE.

The time period manager 1435 may transmit, prior to transmitting the trigger signal, a configuration signal identifying a delay period between transmitting the trigger signal and the scheduled beginning of the downlink transmission.

The repeat trigger response manager 1440 may receive, during the downlink transmission, one or more instances of a repeat trigger response signal over the channel of the shared radio frequency spectrum band.

In some examples, the repeat trigger response manager 1440 may decode the RRS to identify a NAV.

The multi-UE manager 1445 may configure the trigger signal to indicate that the base station has obtained access to the shared radio frequency spectrum band for downlink transmissions to a set of UEs.

In some examples, the multi-UE manager 1445 may receive trigger response signals from a subset of the set of UEs.

In some examples, the multi-UE manager 1445 may select one or more UEs of the subset of UEs to perform the downlink transmissions to.

Figure 15:
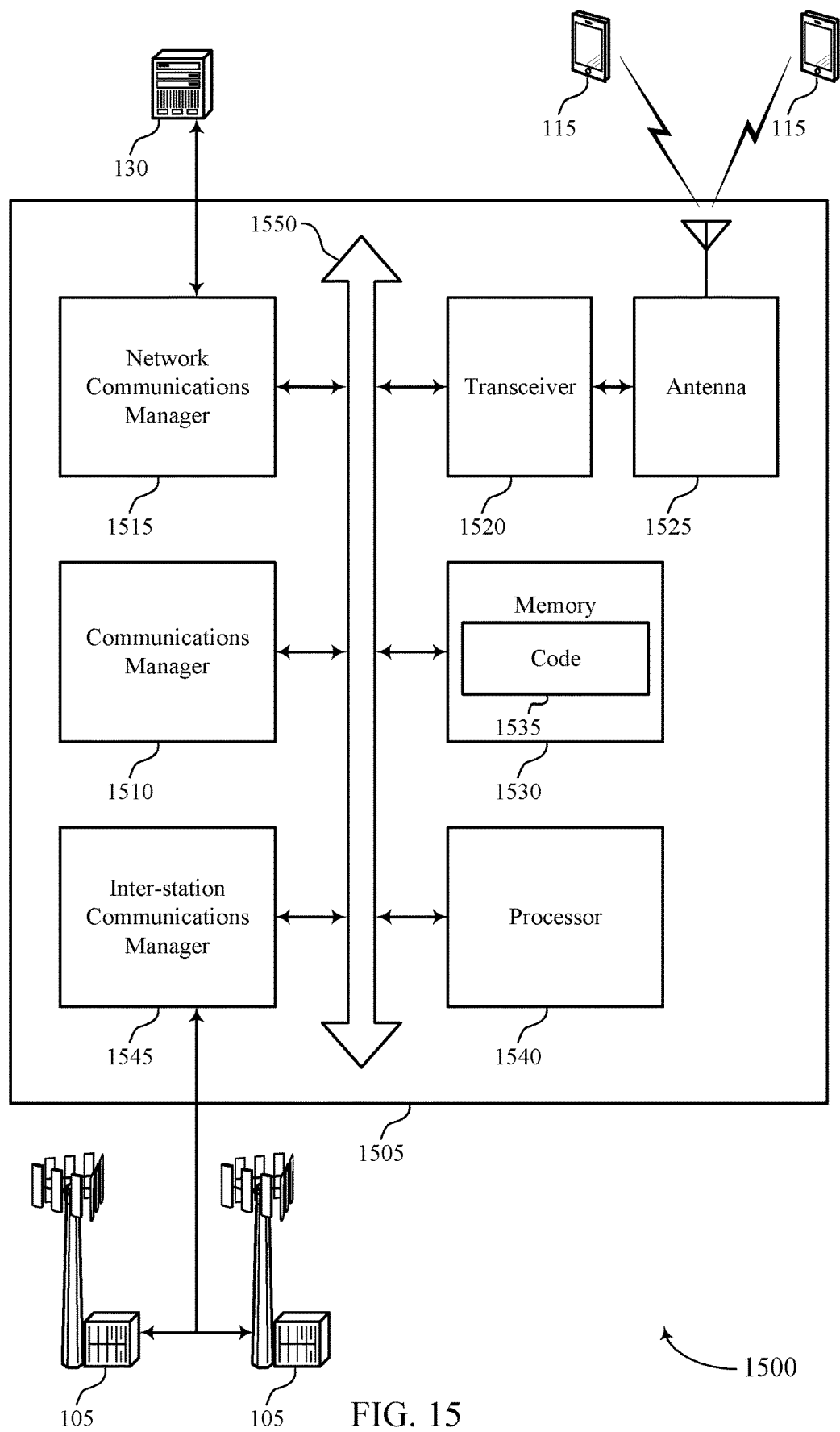
FIG. 15 shows a diagram of a system including a device that supports medium reservation using energy detection and receiver assisted clear channel assessment in accordance with aspects of the present disclosure.

FIG. 15 shows a diagram of a system 1500 including a device 1505 that supports medium reservation using energy detection and receiver assisted clear channel assessment in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit a trigger signal to a UE indicating that the base station has obtained access to a shared radio frequency spectrum band for a downlink transmission to the UE, receive, based on the trigger signal, a trigger response signal configured to reserve the channel of the shared radio frequency spectrum band for the downlink transmission, where the trigger response signal is received for a time period extending to a scheduled beginning of the downlink transmission, and transmit the downlink transmission after an expiration of the time period and based on the trigger signal.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device #{device} to perform various functions (e.g., functions or tasks supporting medium reservation using energy detection and receiver assisted clear channel assessment).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
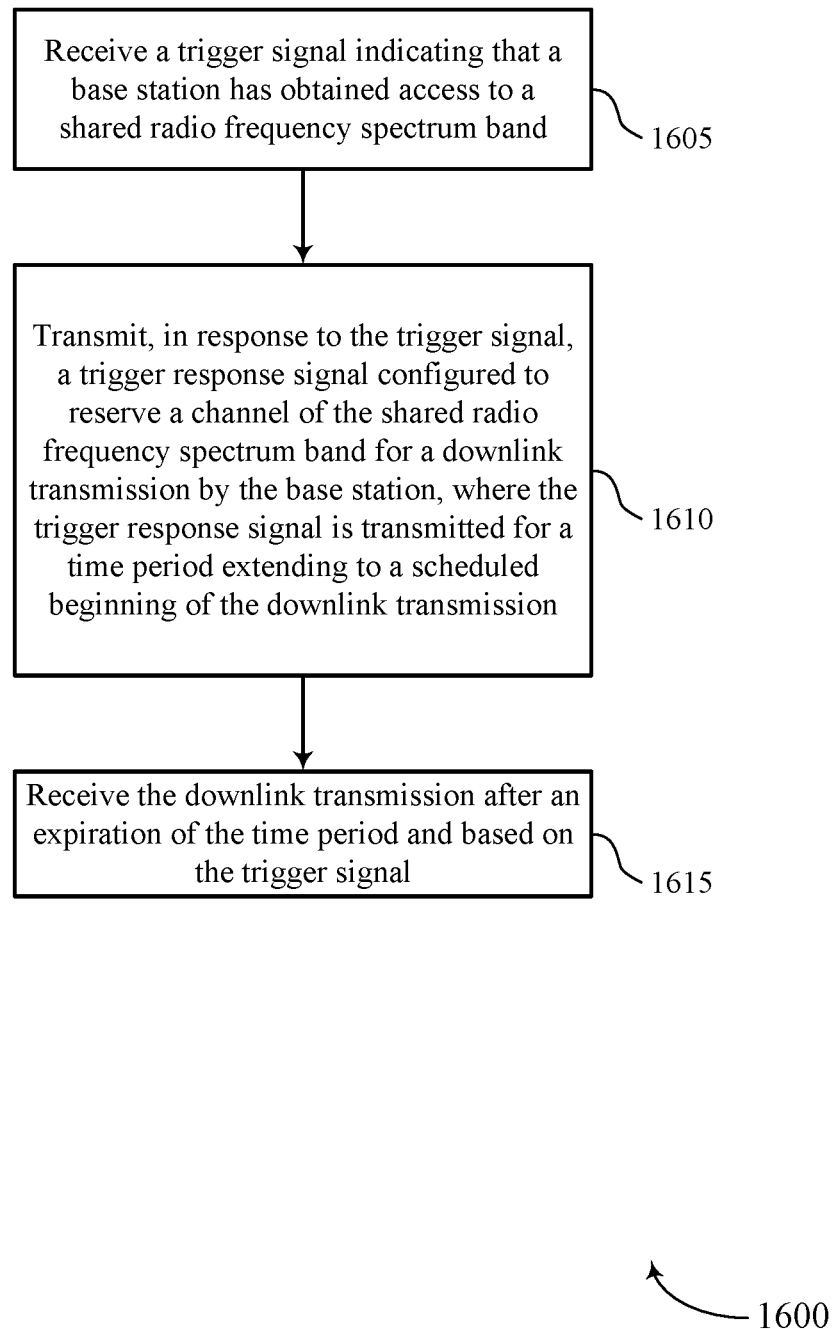
FIGS. 16 through 19 show flowcharts illustrating methods that support medium reservation using energy detection and receiver assisted clear channel assessment in accordance with aspects of the present disclosure.

FIG. 16 shows a flowchart illustrating a method 1600 that supports medium reservation using energy detection and receiver assisted clear channel assessment in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may receive a trigger signal indicating that a base station has obtained access to a shared radio frequency spectrum band. The operations of 1605 may be performed according to the methods described herein. In some examples, aspects of the operations of 1605 may be performed by a trigger signal manager as described with reference to FIGS. 8 through 11.

At 1610, the UE may transmit, in response to the trigger signal, a trigger response signal configured to reserve a channel of the shared radio frequency spectrum band for a downlink transmission by the base station, where the trigger response signal is transmitted for a time period extending to a scheduled beginning of the downlink transmission. The operations of 1610 may be performed according to the methods described herein. In some examples, aspects of the operations of 1610 may be performed by a trigger response signal manager as described with reference to FIGS. 8 through 11.

At 1615, the UE may receive the downlink transmission after an expiration of the time period and based on the trigger signal. The operations of 1615 may be performed according to the methods described herein. In some examples, aspects of the operations of 1615 may be performed by a downlink transmission manager as described with reference to FIGS. 8 through 11.

Figure 17:
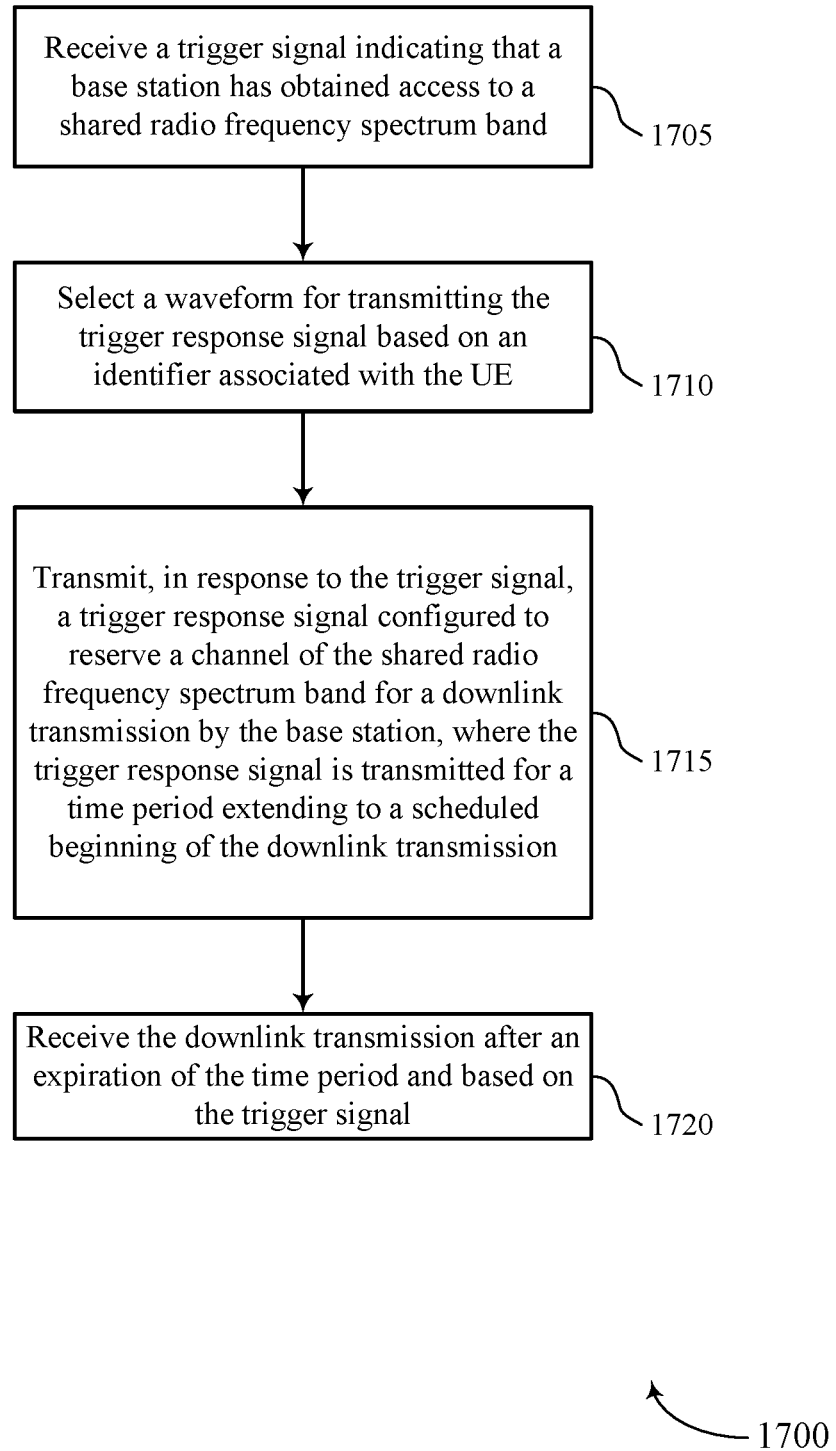

FIG. 17 shows a flowchart illustrating a method 1700 that supports medium reservation using energy detection and receiver assisted clear channel assessment in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may receive a trigger signal indicating that a base station has obtained access to a shared radio frequency spectrum band. The operations of 1705 may be performed according to the methods described herein. In some examples, aspects of the operations of 1705 may be performed by a trigger signal manager as described with reference to FIGS. 8 through 11.

At 1710, the UE may select a waveform for transmitting the trigger response signal based on an identifier associated with the UE. The operations of 1710 may be performed according to the methods described herein. In some examples, aspects of the operations of 1710 may be performed by a waveform manager as described with reference to FIGS. 8 through 11.

At 1715, the UE may transmit, in response to the trigger signal, a trigger response signal configured to reserve a channel of the shared radio frequency spectrum band for a downlink transmission by the base station, where the trigger response signal is transmitted for a time period extending to a scheduled beginning of the downlink transmission. The operations of 1715 may be performed according to the methods described herein. In some examples, aspects of the operations of 1715 may be performed by a trigger response signal manager as described with reference to FIGS. 8 through 11.

At 1720, the UE may receive the downlink transmission after an expiration of the time period and based on the trigger signal. The operations of 1720 may be performed according to the methods described herein. In some examples, aspects of the operations of 1720 may be performed by a downlink transmission manager as described with reference to FIGS. 8 through 11.

Figure 18:
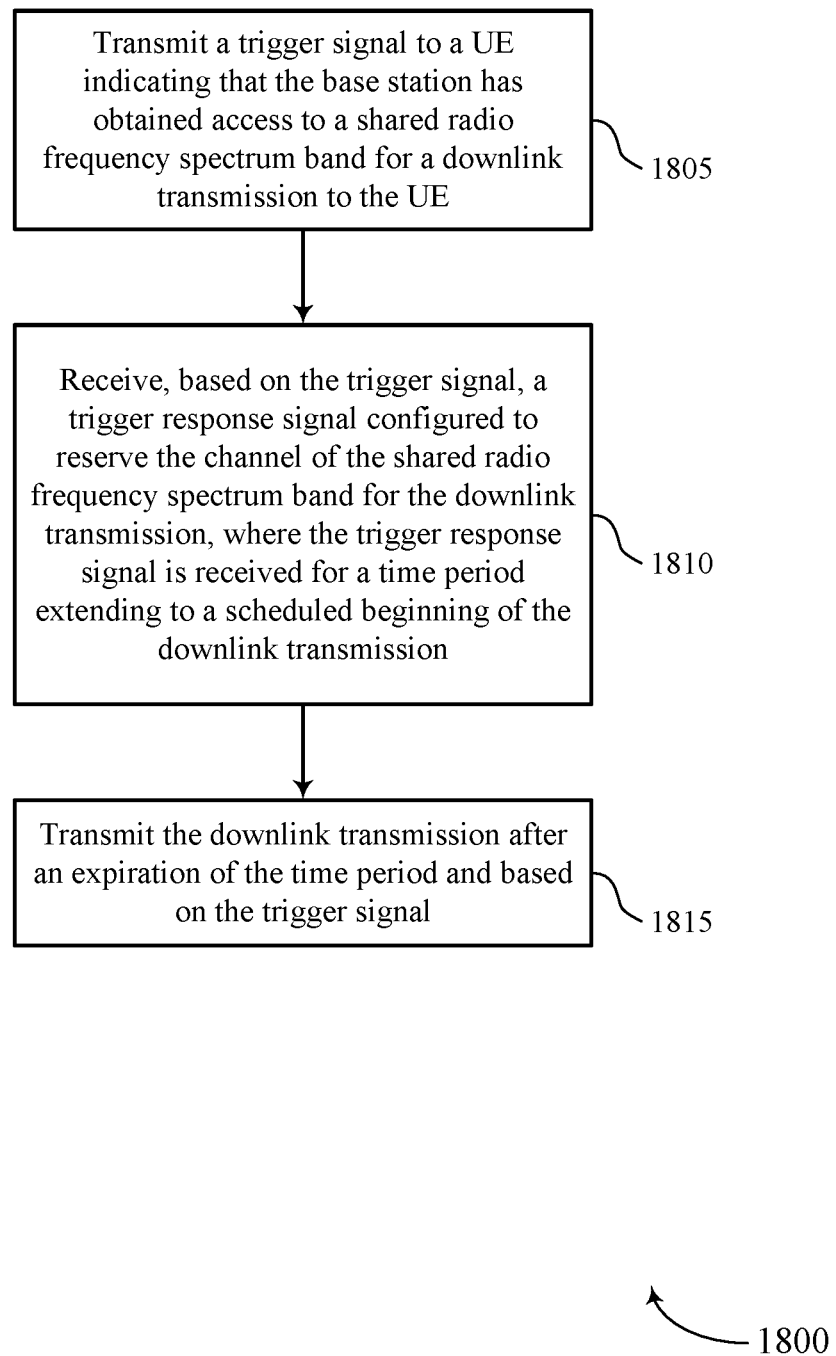

FIG. 18 shows a flowchart illustrating a method 1800 that supports medium reservation using energy detection and receiver assisted clear channel assessment in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1805, the base station may transmit a trigger signal to a UE indicating that the base station has obtained access to a shared radio frequency spectrum band for a downlink transmission to the UE. The operations of 1805 may be performed according to the methods described herein. In some examples, aspects of the operations of 1805 may be performed by a trigger signal manager as described with reference to FIGS. 12 through 15.

At 1810, the base station may receive, based on the trigger signal, a trigger response signal configured to reserve the channel of the shared radio frequency spectrum band for the downlink transmission, where the trigger response signal is received for a time period extending to a scheduled beginning of the downlink transmission. The operations of 1810 may be performed according to the methods described herein. In some examples, aspects of the operations of 1810 may be performed by a trigger response signal manager as described with reference to FIGS. 12 through 15.

At 1815, the base station may transmit the downlink transmission after an expiration of the time period and based on the trigger signal. The operations of 1815 may be performed according to the methods described herein. In some examples, aspects of the operations of 1815 may be performed by a downlink transmission manager as described with reference to FIGS. 12 through 15.

Figure 19:
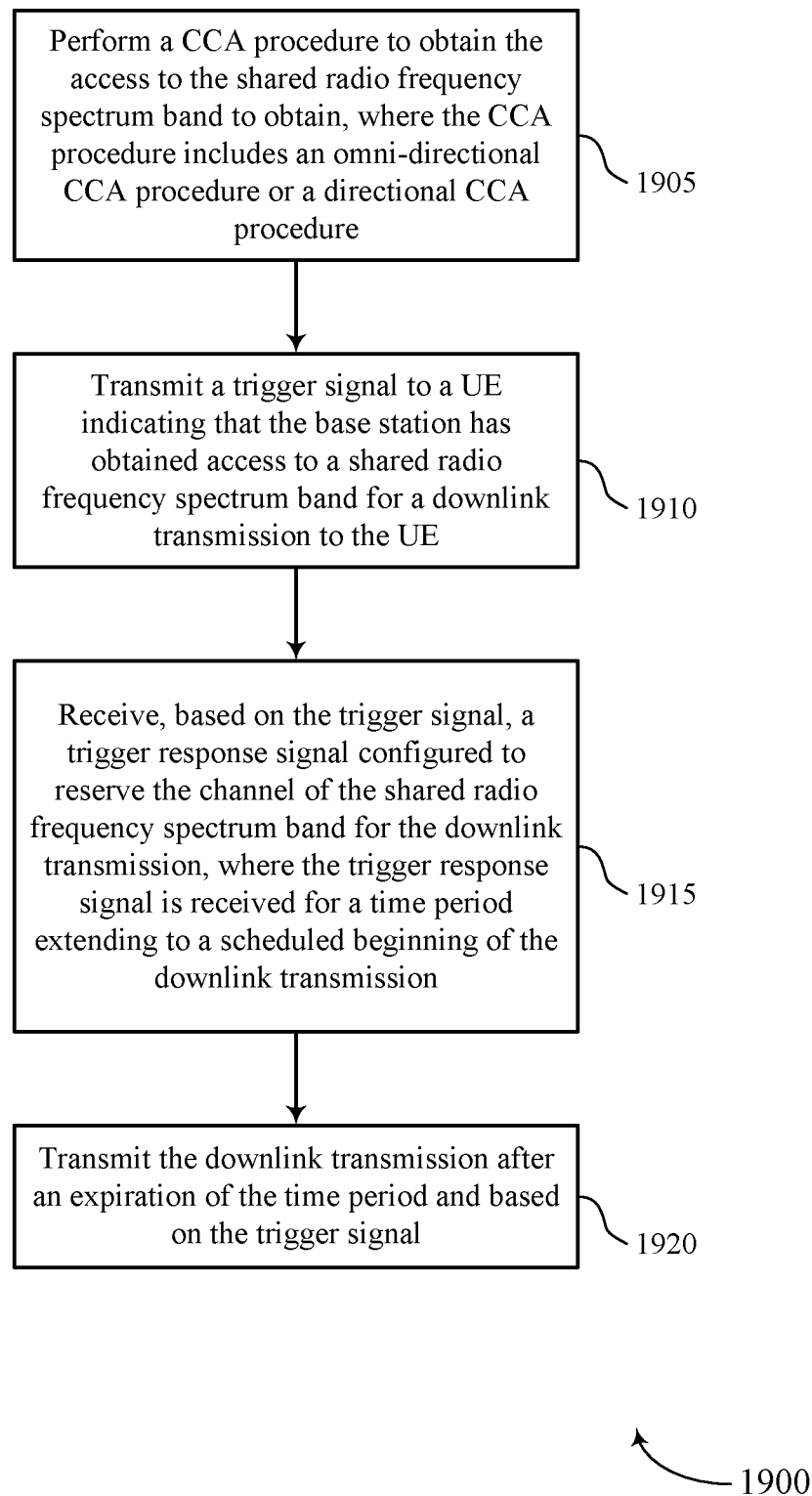

FIG. 19 shows a flowchart illustrating a method 1900 that supports medium reservation using energy detection and receiver assisted clear channel assessment in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1905, the base station may perform a CCA procedure to obtain the access to the shared radio frequency spectrum band, where the CCA procedure includes an omni-directional CCA procedure or a directional CCA procedure. The operations of 1905 may be performed according to the methods described herein. In some examples, aspects of the operations of 1905 may be performed by a CCA manager as described with reference to FIGS. 12 through 15.

At 1910, the base station may transmit a trigger signal to a UE indicating that the base station has obtained access to a shared radio frequency spectrum band for a downlink transmission to the UE. The operations of 1910 may be performed according to the methods described herein. In some examples, aspects of the operations of 1910 may be performed by a trigger signal manager as described with reference to FIGS. 12 through 15.

At 1915, the base station may receive, based on the trigger signal, a trigger response signal configured to reserve the channel of the shared radio frequency spectrum band for the downlink transmission, where the trigger response signal is received for a time period extending to a scheduled beginning of the downlink transmission. The operations of 1915 may be performed according to the methods described herein. In some examples, aspects of the operations of 1915 may be performed by a trigger response signal manager as described with reference to FIGS. 12 through 15.

At 1920, the base station may transmit the downlink transmission after an expiration of the time period and based on the trigger signal. The operations of 1920 may be performed according to the methods described herein. In some examples, aspects of the operations of 1920 may be performed by a downlink transmission manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a trigger signal indicating a scheduled beginning time for a downlink transmission by a network entity that has obtained access to a channel of a shared radio frequency spectrum band;
   transmitting, in response to a completion of the trigger signal, a trigger response signal configured to reserve the channel of the shared radio frequency spectrum band for the downlink transmission by the network entity, wherein the trigger response signal is transmitted by the UE to occupy the channel for a duration of a time period beginning at the completion of the trigger signal and expiring at the scheduled beginning time of the downlink transmission; and
   receiving the downlink transmission via the channel after expiration of the time period and based at least in part on the trigger signal.

2. The method of claim 1, further comprising:
   selecting a waveform for transmitting the trigger response signal based at least in part on an identifier associated with the UE.

3. The method of claim 1, further comprising:
   performing a clear channel assessment (CCA) procedure before transmitting the trigger response signal, wherein the CCA procedure comprises an omni-directional CCA procedure or a directional CCA procedure.

4. The method of claim 1, further comprising:
   identifying a delay period between receiving the trigger signal and the scheduled beginning time of the downlink transmission, wherein the time period for occupying the channel is based at least in part on a duration of the delay period.

5. The method of claim 4, further comprising:
   receiving, prior to sending the trigger response signal, a configuration signal indicating the delay period.

6. The method of claim 5, wherein the configuration signal is received prior to the trigger signal.

7. The method of claim 1, further comprising:
   transmitting, during a scheduled period of the downlink transmission, one or more instances of a repeat trigger response signal over the channel of the shared radio frequency spectrum band.

8. The method of claim 1, wherein the trigger response signal comprises a reservation response signal (RRS), further comprising:
   setting a network allocation vector (NAV) of the RRS based at least in part on the time period.

9. A method for wireless communications at a network entity, comprising:
   transmitting a trigger signal to a user equipment (UE) indicating a scheduled beginning time for a downlink transmission by the network entity that has obtained access to a channel of a shared radio frequency spectrum band;
   receiving, based at least in part on a completion of the trigger signal, a trigger response signal configured to reserve the channel of the shared radio frequency spectrum band for the downlink transmission, wherein the trigger response signal is received from the UE to occupy the channel for a duration of a time period beginning at the completion of the trigger signal and expiring at the scheduled beginning time of the downlink transmission; and
   transmitting the downlink transmission via the channel after expiration of the time period and based at least in part on the trigger signal.

10. The method of claim 9, further comprising:
    performing a clear channel assessment (CCA) procedure to obtain access to the shared radio frequency spectrum band, wherein the CCA procedure comprises an omni-directional CCA procedure or a directional CCA procedure.

11. The method of claim 9, further comprising:
    determining, based at least in part on a waveform used for the trigger response signal, an identifier associated with the UE.

12. The method of claim 9, further comprising:
transmitting, prior to transmitting the trigger signal, a configuration signal identifying a delay period between transmitting the trigger signal and the scheduled beginning time of the downlink transmission, wherein the time period for occupying the channel is based at least in part on a duration of the delay period.

13. The method of claim 9, further comprising:
receiving, during the downlink transmission, one or more instances of a repeat trigger response signal over the channel of the shared radio frequency spectrum band.

14. The method of claim 9, further comprising:
configuring the trigger signal to indicate that the network entity has obtained access to the shared radio frequency spectrum band for downlink transmissions to a plurality of UEs.

15. The method of claim 14, further comprising:
receiving trigger response signals from a subset of the plurality of UEs; and
selecting one or more UEs of the subset of the plurality of UEs to perform the downlink transmissions to.

16. The method of claim 9, wherein the trigger response signal comprises a reservation response signal (RRS), further comprising:
decoding the RRS to identify a network allocation vector (NAV).

17. An apparatus for wireless communications at a user equipment (UE), comprising:
a processor,
memory coupled with the processor; and
instructions stored in the memory, wherein the instructions are executable by the processor to:
receive a trigger signal indicating a scheduled beginning time for a downlink transmission by a network entity that has obtained access to a channel of a shared radio frequency spectrum band;
transmit, in response to a completion of the trigger signal, a trigger response signal configured to reserve the channel of the shared radio frequency spectrum band for the downlink transmission by the network entity, wherein the trigger response signal is transmitted by the UE to occupy the channel for a duration of a time period beginning at the completion of the trigger signal and expiring at the scheduled beginning time of the downlink transmission; and
receive the downlink transmission via the channel after expiration of the time period and based at least in part on the trigger signal.

18. The apparatus of claim 17, wherein the instructions are executable by the processor to:
select a waveform for transmitting the trigger response signal based at least in part on an identifier associated with the UE.

19. The apparatus of claim 17 wherein the instructions are executable by the processor to:
perform a clear channel assessment (CCA) procedure before transmitting the trigger response signal, wherein the CCA procedure comprises an omni-directional CCA procedure or a directional CCA procedure.

20. The apparatus of claim 17, wherein the instructions are executable by the processor to:
identify a delay period between receiving the trigger signal and the scheduled beginning time of the downlink transmission, wherein the time period for occupying the channel is based at least in part on a duration of the delay period.

21. The apparatus of claim 20, wherein the instructions are executable by the processor to:
receive, prior to sending the trigger response signal, a configuration signal indicating the delay period.

22. The apparatus of claim 21, wherein the configuration signal is received prior to the trigger signal.

23. The apparatus of claim 17, wherein the instructions are executable by the processor to:
transmit, during a scheduled period of the downlink transmission, one or more instances of a repeat trigger response signal over the channel of the shared radio frequency spectrum band.

24. The apparatus of claim 17, wherein the trigger response signal comprises a reservation response signal (RRS), and the instructions are executable by the processor to:
set a network allocation vector (NAV) of the RRS based at least in part on the time period.

25. An apparatus for wireless communications at a network entity, comprising:
a processor,
memory coupled with the processor; and
instructions stored in the memory, wherein the instructions are executable by the processor to:
transmit a trigger signal to a user equipment (UE) indicating a scheduled beginning time for a downlink transmission by the network entity that has obtained access to a channel of a shared radio frequency spectrum band;
receive, based at least in part on a completion of the trigger signal, a trigger response signal configured to reserve the channel of the shared radio frequency spectrum band for the downlink transmission, wherein the trigger response signal is received from the UE to occupy the channel for a duration of a time period beginning at the completion of the trigger signal and expiring at the scheduled beginning time of the downlink transmission; and
transmit the downlink transmission via the channel after expiration of the time period and based at least in part on the trigger signal.

26. The apparatus of claim 25, wherein the instructions are executable by the processor to:
perform a clear channel assessment (CCA) procedure to obtain access to the shared radio frequency spectrum band, wherein the CCA procedure comprises an omni-directional CCA procedure or a directional CCA procedure.

27. The apparatus of claim 25, wherein the instructions are executable by the processor to:
determine, based at least in part on a waveform used for the trigger response signal, an identifier associated with the UE.

28. The apparatus of claim 25, wherein the instructions are executable by the processor to:
transmit, prior to transmitting the trigger signal, a configuration signal identifying a delay period between transmitting the trigger signal and the scheduled beginning time of the downlink transmission, wherein the time period for occupying the channel is based at least in part on a duration of the delay period.

29. The apparatus of claim 25, wherein the instructions are executable by the processor to:
receive, during the downlink transmission, one or more instances of a repeat trigger response signal over the channel of the shared radio frequency spectrum band.

30. The apparatus of claim 25, wherein the instructions are executable by the processor to:
  configure the trigger signal to indicate that the network entity has obtained access to the shared radio frequency spectrum band for downlink transmissions to a plurality of UEs.

* * * * *